US012666171B2

(12) United States Patent
Shiotani et al.

(10) Patent No.: US 12,666,171 B2
(45) Date of Patent: Jun. 23, 2026

(54) SOLID-STATE IMAGING ELEMENT, IMAGING DEVICE, AND METHOD FOR CONTROLLING SOLID-STATE IMAGING ELEMENT

(71) Applicant: SONY SEMICONDUCTOR SOLUTIONS CORPORATION, Kanagawa (JP)

(72) Inventors: Yoshimitsu Shiotani, Kanagawa (JP); Takuya Mikami, Kanagawa (JP); Takao Konishi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 39 days.

(21) Appl. No.: 18/717,899

(22) PCT Filed: Oct. 21, 2022

(86) PCT No.: PCT/JP2022/039216
§ 371 (c)(1),
(2) Date: Jun. 7, 2024

(87) PCT Pub. No.: WO2023/112480
PCT Pub. Date: Jun. 22, 2023

(65) Prior Publication Data
US 2025/0047994 A1      Feb. 6, 2025

(30) Foreign Application Priority Data
Dec. 16, 2021      (JP) ................................ 2021-203909

(51) Int. Cl.
H04N 25/633      (2023.01)
H04N 25/702      (2023.01)
(Continued)

(52) U.S. Cl.
CPC ......... H04N 25/633 (2023.01); H04N 25/702 (2023.01); H04N 25/703 (2023.01); H04N 25/77 (2023.01); H04N 25/78 (2023.01)

(58) Field of Classification Search
CPC .. H04N 25/633; H04N 25/702; H04N 25/703; H04N 25/77; H04N 25/78; H04N 25/63; H04N 25/70
See application file for complete search history.

(56) References Cited

U.S. PATENT DOCUMENTS

2009/0086069 A1*    4/2009  Gomi ..................... H04N 23/12
                                                           348/294
2012/0224086 A1*    9/2012  Takita .................. H04N 25/677
                                                           348/243
(Continued)

FOREIGN PATENT DOCUMENTS

JP          2009-089219 A      4/2009
JP          2010-147785 A      7/2010
(Continued)

OTHER PUBLICATIONS

International Search Report and Written Opinion of PCT Application No. PCT/JP2022/039216, issued on Dec. 13, 2022, 09 pages of ISRWO.

*Primary Examiner* — Nhan T Tran
(74) *Attorney, Agent, or Firm* — CHIP LAW GROUP

(57) ABSTRACT

In a solid-state imaging element in which effective pixels are arranged, image quality of image data is improved. In a pixel array unit, a plurality of effective pixels that is not shaded from light is arranged. A drive unit performs control to drive each of the plurality of effective pixels to generate an analog signal according to the exposure amount as an effective pixel signal and control to drive a specific pixel among the plurality of effective pixels to generate an analog signal according to a dark current as an additional shaded pixel (Continued)

signal. A signal processing unit corrects the effective pixel signal using the additional shaded pixel signal.

11 Claims, 30 Drawing Sheets

(51) Int. Cl.
*H04N 25/703* (2023.01)
*H04N 25/77* (2023.01)
*H04N 25/78* (2023.01)

(56) References Cited

U.S. PATENT DOCUMENTS

| | | | | |
|---|---|---|---|---|
| 2016/0165159 | A1* | 6/2016 | Hseih | H10F 39/813 |
| | | | | 348/273 |
| 2019/0019835 | A1* | 1/2019 | Tanaka | H10F 39/1825 |
| 2020/0280692 | A1* | 9/2020 | Akahane | H04N 25/618 |
| 2021/0383555 | A1* | 12/2021 | Shin | H04N 25/134 |

FOREIGN PATENT DOCUMENTS

| | | |
|---|---|---|
| JP | 2012-114782 A | 6/2012 |
| JP | 2015-072982 A | 4/2015 |

* cited by examiner

| R | Gr | Gr | R | Gr | Gr | R | Gr | Gr | R | Gr | Gr | ... |
|---|----|----|---|----|----|---|----|----|---|----|----|---|
| R | R | Gr | R | R | Gr | R | R | Gr | R | R | Gr | |
| R | Gr | Gr | R | Gr | Gr | R | Gr | Gr | R | Gr | Gr | |
| Gb | Gb | B | Gb | Gb | B | Gb | Gb | B | Gb | Gb | B | |
| Gb | B | B | Gb | B | B | Gb | B | B | Gb | B | B | |
| Gb | Gb | B | Gb | Gb | B | Gb | Gb | B | Gb | Gb | B | |
| R | Gr | Gr | R | Gr | Gr | R | Gr | Gr | R | Gr | Gr | |
| R | R | Gr | R | R | Gr | R | R | Gr | R | R | Gr | |
| R | Gr | Gr | R | Gr | Gr | R | Gr | Gr | R | Gr | Gr | |
| Gb | Gb | B | Gb | Gb | B | Gb | Gb | B | Gb | Gb | B | |
| Gb | B | B | Gb | B | B | Gb | B | B | Gb | B | B | |
| Gb | Gb | B | Gb | Gb | B | Gb | Gb | B | Gb | Gb | B | |

Figure 10:
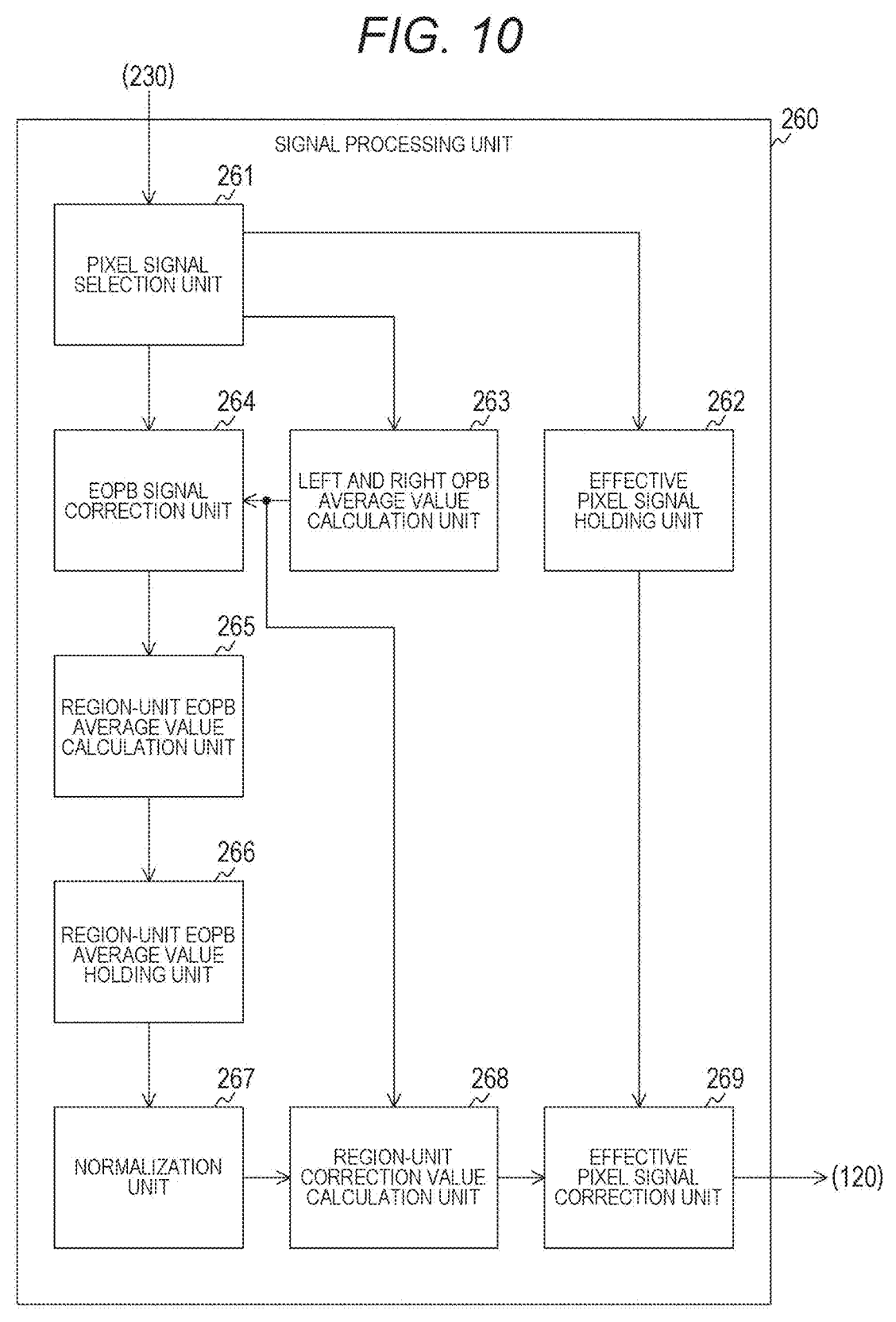

SIGNAL PROCESSING UNIT

261

PIXEL SIGNAL SELECTION UNIT

264

EOPB SIGNAL CORRECTION UNIT

263

LEFT AND RIGHT OPB AVERAGE VALUE CALCULATION UNIT

262

EFFECTIVE PIXEL SIGNAL HOLDING UNIT

265

REGION-UNIT EOPB AVERAGE VALUE CALCULATION UNIT

266

REGION-UNIT EOPB AVERAGE VALUE HOLDING UNIT

267

NORMALIZATION UNIT

268

REGION-UNIT CORRECTION VALUE CALCULATION UNIT

269

EFFECTIVE PIXEL SIGNAL CORRECTION UNIT (120)

*FIG. 16*

|   | 1 | 2 | 3 | 4 | 5 | 6 | 7 | 8 |
|---|---|---|---|---|---|---|---|---|
| 1 | Gb | Gb | B | B | Gb | Gb | B | B |
| 2 | Gb | Gb | B | B | Gb | Gb | B | B |
| 3 | R | R | Gr | Gr | R | R | Gr | Gr |
| 4 | R | R | Gr | Gr | R | R | Gr | Gr |
| 5 | Gb | Gb | B | B | Gb | Gb | B | B |
| 6 | Gb | Gb | B | B | Gb | Gb | B | B |
| 7 | R | R | Gr | Gr | R | R | Gr | Gr |
| 8 | R | R | Gr | Gr | R | R | Gr | Gr |

|   | 1 | 2 | 3 | 4 | 5 | 6 | 7 | 8 |
|---|---|---|---|---|---|---|---|---|
| 1 | Gb | Gb | B | B | Gb | Gb | B | B |
| 2 | Gb | Gb | B | B | Gb | Gb | B | B |
| 3 | R | R | Gr | Gr | R | R | Gr | Gr |
| 4 | R | R | Gr | Gr | R | R | Gr | Gr |
| 5 | Gb | Gb | B | B | Gb | Gb | B | B |
| 6 | Gb | Gb | B | B | Gb | Gb | B | B |
| 7 | R | R | Gr | Gr | R | R | Gr | Gr |
| 8 | R | R | Gr | Gr | R | R | Gr | Gr |

221
· · ·

FIG. 18B 390                                                    221                    390
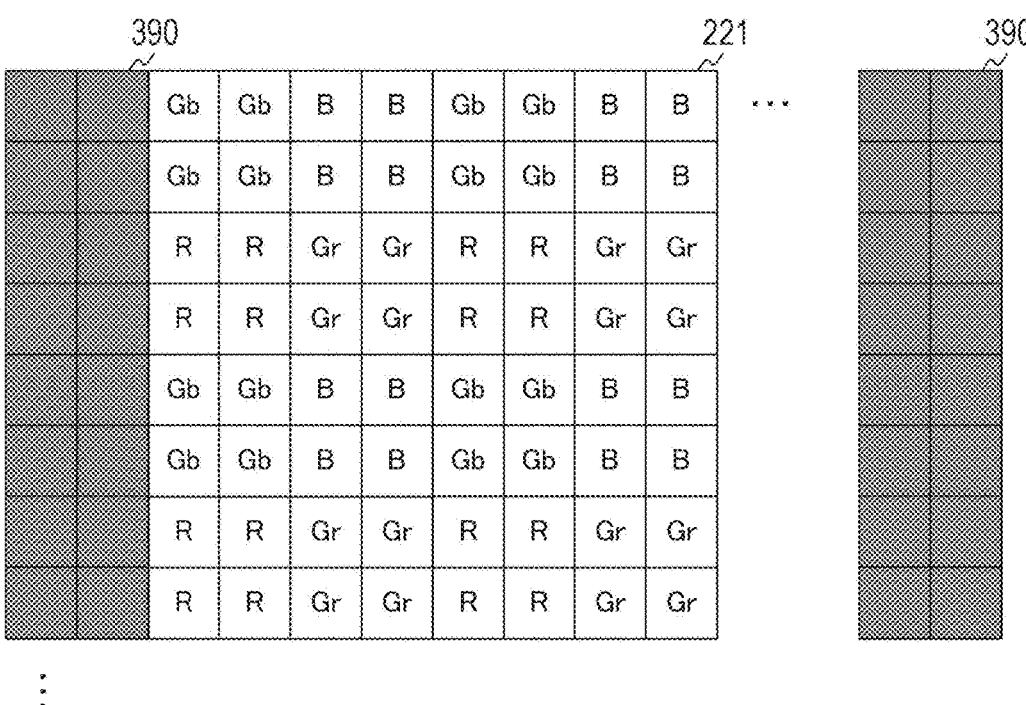
FIG. 19A
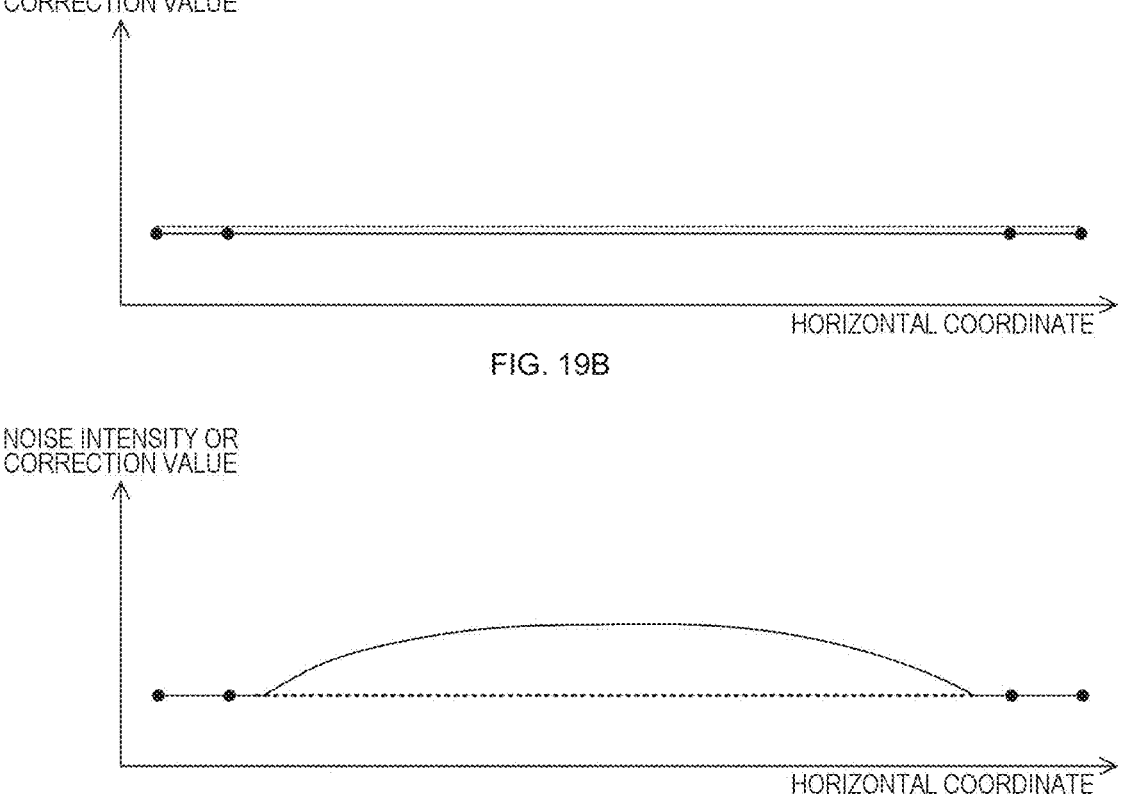
FIG. 19B
FIG. 19C

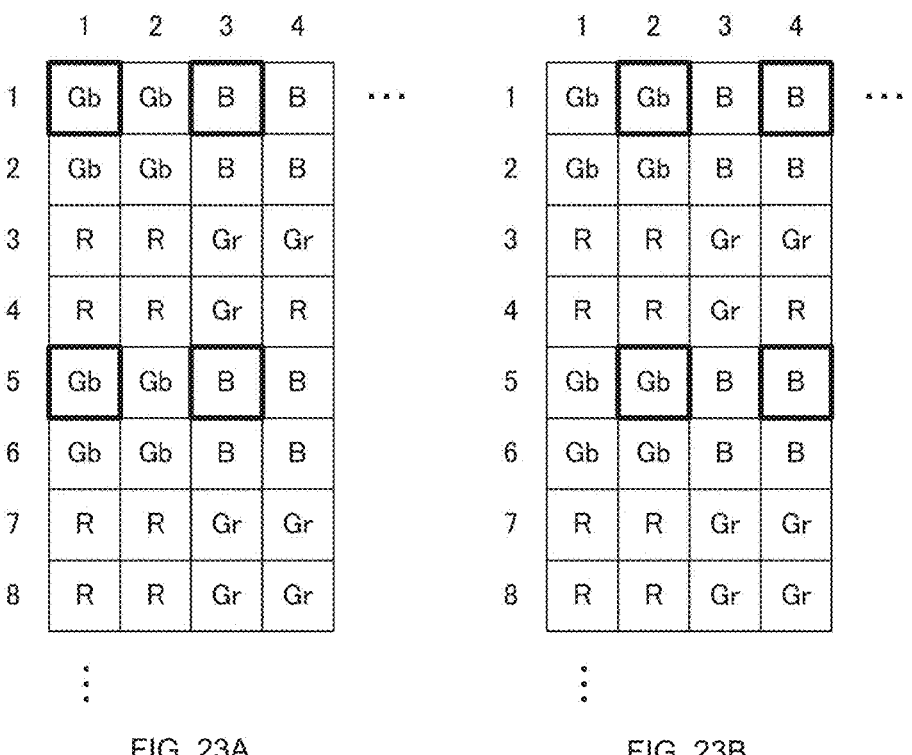
FIG. 23A                    FIG. 23B

SOLID-STATE IMAGING ELEMENT, IMAGING DEVICE, AND METHOD FOR CONTROLLING SOLID-STATE IMAGING ELEMENT

CROSS REFERENCE TO RELATED APPLICATIONS

This application is a U.S. National Phase of International Patent Application No. PCT/JP2022/039216 filed on Oct. 21, 2022, which claims priority benefit of Japanese Patent Application No. JP 2021-203909 filed in the Japan Patent Office on Dec. 16, 2021. Each of the above-referenced applications is hereby incorporated herein by reference in its entirety.

TECHNICAL FIELD

The present technology relates to a solid-state imaging element. Specifically, the present technology relates to a solid-state imaging element, an imaging device, and a method for controlling a solid-state imaging element that correct dark current noise of a pixel signal.

BACKGROUND ART

In recent years, there has been an increasing demand for higher sensitivity of solid-state imaging elements, and control for increasing a gain when amplifying a pixel signal is performed in response to the demand. However, as the gain is increased, a black shift of a dark portion is amplified, resulting in a possibility that black floating or black sinking occurs. Therefore, a correction method has been proposed in which shaded pixels are arranged around an effective pixel region, and pixel signals of effective pixels are corrected using pixel signals of the shaded pixels (See, for example, Patent Document 1).

CITATION LIST

Patent Document

Patent Document 1: Japanese Patent Application Laid-Open No. 2012-114782

SUMMARY OF THE INVENTION

Problems to be Solved by the Invention

In the above-described conventional technique, linear dark current noise generated in the effective pixel region is corrected. However, in the above-described conventional technology, non-linear dark current noise due to local dark current fluctuation in the effective pixel region cannot be sufficiently removed. For this reason, there is a problem that an image quality of image data is degraded due to nonlinear noise.

The present technology has been made in view of such a situation, and an object of the present technology is to improve image quality of image data in a solid-state imaging element in which effective pixels are arranged.

Solutions to Problems

The present technology has been made to solve the above-described problems, and a first aspect thereof is a solid-state imaging element including: a pixel array unit in which a plurality of effective pixels that is not shaded from light is arranged; a drive unit that performs control of driving each of the plurality of effective pixels to generate an analog signal according to an exposure amount as an effective pixel signal and control of driving a specific pixel among the plurality of effective pixels to generate an analog signal according to a dark current as an additional shaded pixel signal; and a signal processing unit that corrects the effective pixel signal using the additional shaded pixel signal, and a control method thereof. As a result, a non-linear noise is removed.

Furthermore, in the first aspect, the pixel array unit may include a decapixel block in which ten effective pixels sharing a floating diffusion layer are arranged, and an octapixel block in which eight effective pixels sharing the floating diffusion layer are arranged. This brings about an effect that nonlinear noise is removed from the effective pixel signal in the decapixel block or the octapixel block.

Furthermore, in the first aspect, a first analog-to-digital converter that converts the effective pixel signal from the effective pixel in the decapixel block into a digital signal, and a second analog-to-digital converter that converts the effective pixel signal from the effective pixel in the octapixel block into a digital signal may be further included. This brings about an effect of improving the conversion speed.

Furthermore, in the first aspect, the drive unit may drive the effective pixel in the decapixel block as the specific pixel, and the second analog-to-digital converter may convert each of the effective pixel signal and the additional shaded pixel signal into a digital signal. This brings about an effect of suppressing a decrease in a frame rate.

Furthermore, in the first aspect, the pixel array unit may include a predetermined number of pixel blocks in which a plurality of effective pixels sharing the floating diffusion layer is arranged, and the drive unit may drive some effective pixels in the pixel block as the specific pixels. This brings about an effect that nonlinear noise is removed from the effective pixel signal in the pixel block.

Furthermore, in the first aspect, the drive unit may generate image data by control of driving the specific pixel and the remaining effective pixels in the pixel array unit. This brings about an effect that an image quality of image data is improved.

Furthermore, in the first aspect, the drive unit may cause image data to be generated by control for driving all the effective pixels and the specific pixel in the pixel array unit. This brings about an effect of suppressing a decrease in a frame rate.

Furthermore, in the first aspect, the pixel array unit may be divided into a predetermined number of correction regions, and the signal processing unit may include an effective pixel signal correction unit that corrects the effective pixel signal of the effective pixel in the correction region using the additional shaded pixel signal of the specific pixel in the correction region. This brings about an effect that the effective pixel signal is corrected for each correction region.

Furthermore, in the first aspect, the signal processing unit may further include an effective pixel signal correction unit that holds the effective pixel signal. This brings about an effect that the effective pixel signal is corrected by the additional shaded pixel signal in the current frame.

Furthermore, in the first aspect, the pixel array unit may further include a shaded pixel, the signal processing unit may further include an additional shaded pixel signal correction unit that corrects the additional shaded pixel signal by using the shaded pixel signal from the shaded pixel, and the effective pixel signal correction unit may correct the effective pixel signal by using the corrected additional shaded pixel signal and the shaded pixel signal. This brings about an effect that a lateral drawing noise is removed.

Furthermore, a second aspect of the present technology is an imaging device including: a pixel array unit in which a plurality of effective pixels that is not shaded from light is arranged; a drive unit that performs control of driving each of the plurality of effective pixels to generate an analog signal according to an exposure amount as an effective pixel signal and control of driving a specific pixel among the plurality of effective pixels to generate an analog signal according to a dark current as an additional shaded pixel signal; a signal processing unit that corrects the effective pixel signal using the additional shaded pixel signal; and a recording unit that records image data in which the corrected effective pixel signals are arranged. This brings about an effect that an image quality of image data is improved.

BRIEF DESCRIPTION OF DRAWINGS

FIG. 3 is a diagram illustrating an example of a correction region according to the first embodiment of the present technology.

FIG. 4 is a diagram illustrating an example of image data obtained when binning is performed according to the first embodiment of the present technology.

FIG. 8 is a block diagram illustrating a configuration example of a reading unit according to the first embodiment of the present technology.

FIG. 10 is a block diagram illustrating a configuration example of a signal processing unit when buffering the effective pixel signal according to the first embodiment of the present technology.

FIG. 16 is an example of a plan view of a pixel array unit according to a second embodiment of the present technology.

FIGS. 18A and 18B are diagrams illustrating a pixel driving method according to the second embodiment of the present technology.

FIGS. 19A, 19B, and 19C are diagrams illustrating an effect of correction in a comparative example.

FIGS. 23A and 23B are diagrams illustrating a driving method up to tenth AD conversion in the first modification of the second embodiment of the present technology.

FIG. 24 is a diagram illustrating an example of a correction region in the first modification of the second embodiment of the present technology.

FIG. 26 is an example of a plan view of a pixel array unit in a second modification of the second embodiment of the present technology.

MODE FOR CARRYING OUT THE INVENTION

Hereinafter, modes for carrying out the present technology (hereinafter, referred to as embodiments) are described. The description will be given in the following order.

1. First Embodiment (an example of generating an additional shaded pixel signal for a specific pixel)
2. Second Embodiment (an example of generating an additional shaded pixel signal for a specific pixel in a quad Bayer array)
3. Application example to mobile object

1. FIRST EMBODIMENT

[Configuration Example of Imaging Device]

Figure 1:
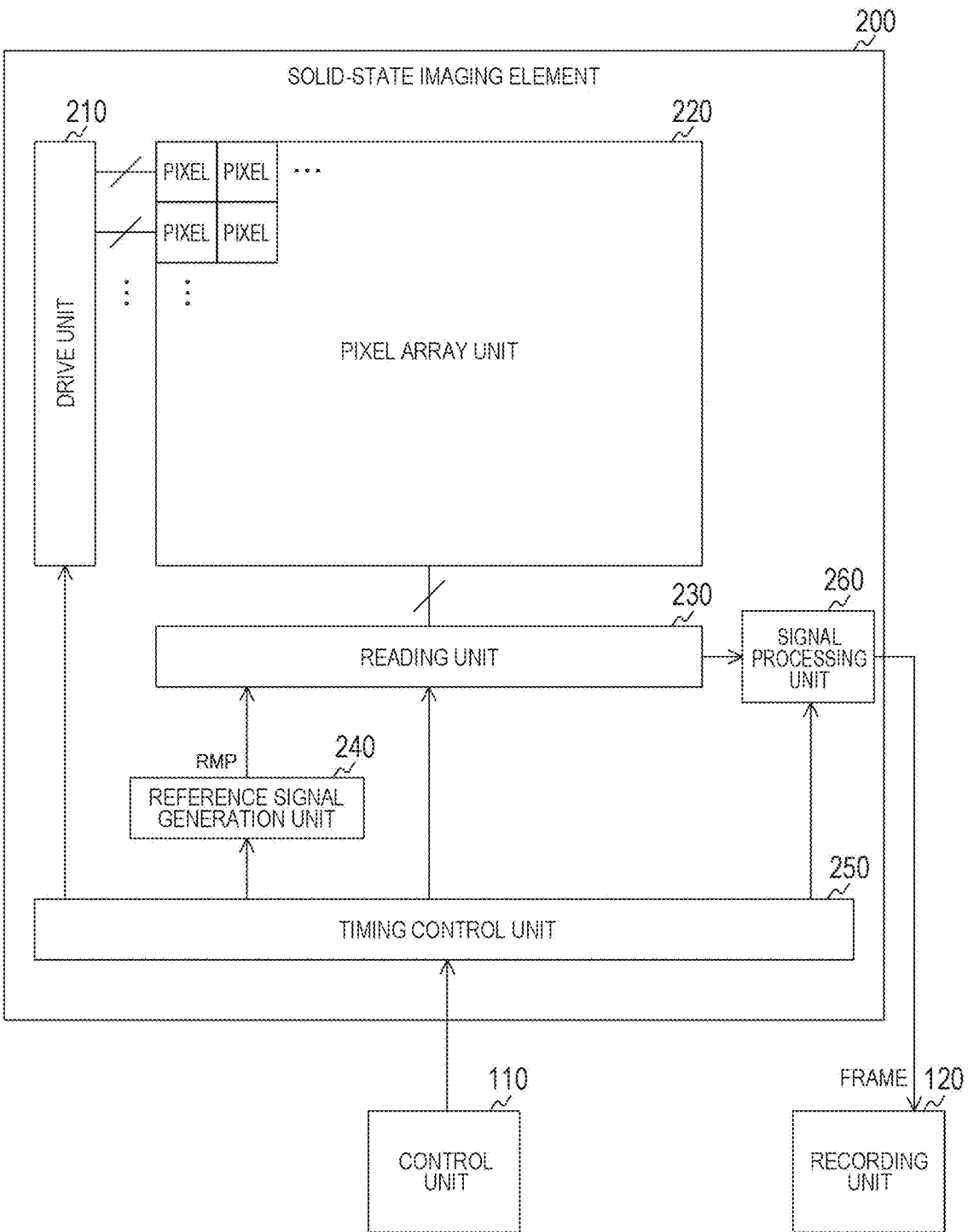
FIG. 1 is a block diagram depicting a configuration example of an imaging device according to a first embodiment of the present technology.

FIG. 1 is a block diagram depicting a configuration example of an imaging device 100 according to a first embodiment of the present technology. The imaging device 100 is a device for capturing image data, and includes a solid-state imaging element 200, a control unit 110, and a recording unit 120. As the imaging device 100, a digital camera or an electronic device (a smartphone, a personal computer, or the like) having an imaging function is assumed.

The solid-state imaging element 200 generates image data (that is, the frame) by photoelectric conversion, and includes a drive unit 210, a pixel array unit 220, a reading unit 230, a reference signal generation unit 240, a timing control unit 250, and a signal processing unit 260.

The control unit 110 controls the solid-state imaging element 200 to image a frame. The control unit 110 supplies an imaging control signal including, for example, a vertical synchronization signal to the solid-state imaging element 200. The recording unit 120 records a frame.

Here, the vertical synchronization signal is a signal indicating imaging timing, and a periodic signal having a constant frequency (such as 60 hertz) is used as the vertical synchronization signal.

In the solid-state imaging element 200, a plurality of pixels is arranged in a two-dimensional lattice pattern in the pixel array unit 220. The drive unit 210 drives the pixel array unit 220 to output the pixel signal to the reading unit 230.

The reading unit 230 performs AD conversion processing and correlated double sampling (CDS) processing on each of the pixel signals. The reading unit 230 supplies a frame in which the processed signals are arranged to the signal processing unit 260.

The signal processing unit 260 performs various types of image processing such as dark correction processing and demosaic processing on the frame. The signal processing unit 260 supplies the processed frame to the recording unit 120.

The reference signal generation unit 240 performs digital-to-analog (DA) conversion on a signal from the timing control unit 250 to generate a reference signal RMP. For example, a sawtooth wave-shaped ramp signal is used as the reference signal, and for example, a digital to analog converter (DAC) is used as the reference signal generation unit 240. The reference signal generation unit 240 supplies the generated reference signal RMP to the reading unit 230.

The timing control unit 250 controls the operation timing of each of the drive unit 210, the reference signal generation unit 240, and the reading unit 230 in synchronization with the vertical synchronization signal from the control unit 110.

Note that although the imaging device 100 records the frame, the frame may be transmitted to the outside of the imaging device 100. In this case, an external interface for sending a frame is further provided. Furthermore, the imaging device 100 may display a frame. In this case, a display unit is further provided.

[Configuration Example of Pixel Array Unit]

Figure 2:
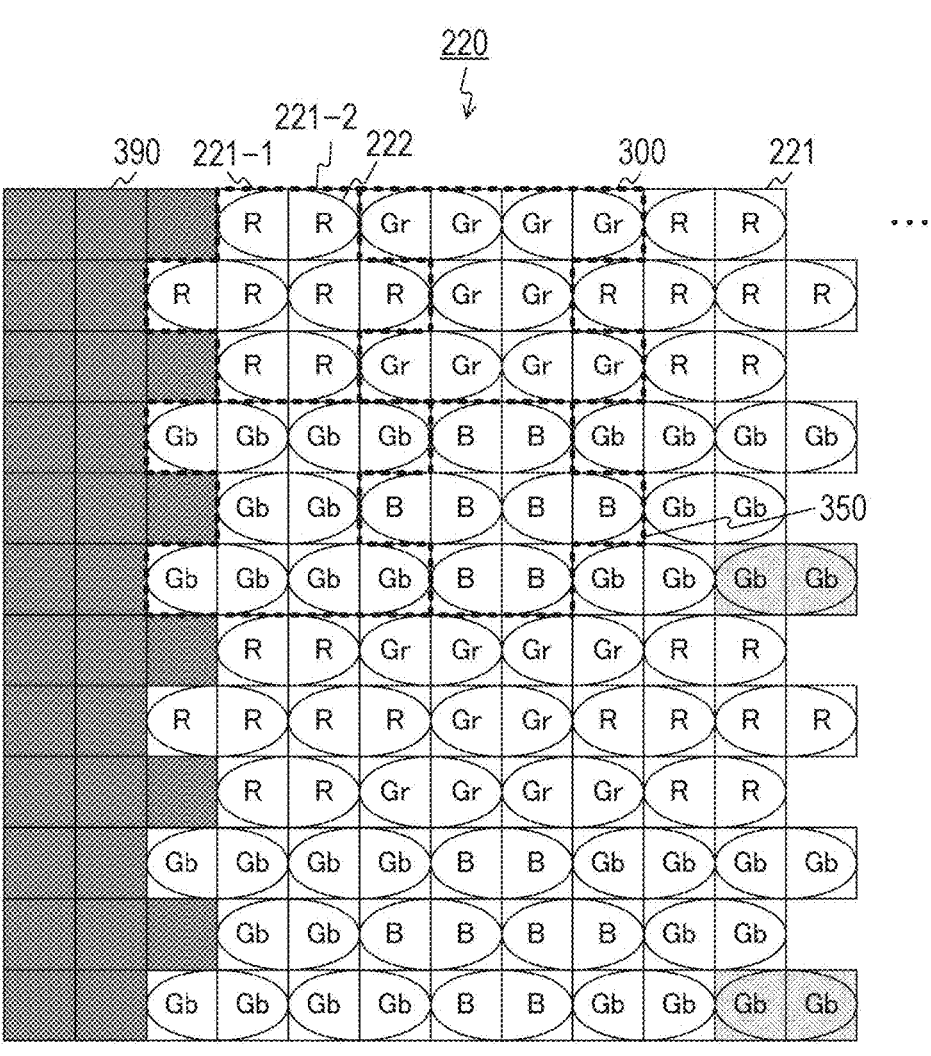
FIG. 2 is an example of a plan view of a pixel array unit according to the first embodiment of the present technology.

FIG. 2 is an example of a plan view of the pixel array unit 220 according to the first embodiment of the present technology. In the pixel array unit 220, a plurality of shaded pixels 390 that is shaded from light and a plurality of effective pixels 221 that is not shaded from light are arranged in a two-dimensional lattice pattern. In the drawing, black pixels indicate the shaded pixels 390. The shaded pixel 390 is also referred to as an optical black (OPB) pixel.

Each of the effective pixels 221 receives and photoelectrically converts visible light of any of red (R), green (G), and blue (B) colors. The effective pixels 221 that receive the respective R, G, and B will be hereinafter referred to as "R pixel", "G pixel", and "B pixel". Furthermore, "Gr" indicates a G pixel arranged in a row including an R pixel, and "Gb" indicates a G pixel arranged in a row including a B pixel.

Furthermore, the pixel array unit 220 includes a predetermined number of pixel blocks in each of which a plurality of effective pixels 221 is arranged.

For example, two types of a decapixel block 300 and an octapixel block 350 are arranged as the pixel block. In the decapixel block 300, ten G pixels are arranged, and these pixels share a floating diffusion layer (not illustrated). In the octapixel block 350, eight R pixels or eight B pixels are arranged, which share a floating diffusion layer. In the drawing, a region surrounded by a thick dotted line indicates the decapixel block 300 or the octapixel block 350. As illustrated in the drawing, the decapixel block 300 and the octapixel block 350 are alternately arranged in each of the horizontal direction and the vertical direction.

In the decapixel block 300, G pixels are arranged at ten positions excluding both ends of the second row from twelve positions of 3 rows×4 columns. A shape of the decapixel block 300 can also be expressed as a shape obtained by rotating alphabet "H" by 90 degrees.

In the octapixel block 350, R pixels or B pixels are arranged at eight positions excluding both ends of each of the first row and the third row from twelve positions of 3 rows×4 columns. The octapixel block 350 can also be expressed as a cross shape.

Further, in each of the decapixel block 300 and the octapixel block 350, a pair of adjacent pixels in the same row, such as pixels 221-1 and 221-2, share a microlens 222. A subsequent circuit can acquire a phase difference from the pixel signals of these pixels and perform phase difference auto focus (AF) for detecting a focus position from the phase difference.

The shaded pixels 390 are arranged around the effective pixel region in which the effective pixels 221 are arranged. For example, a predetermined number of columns of shaded pixels 390 are arranged on a left side and a right side of the effective pixel region. In the drawing, three columns of shaded pixels 390 are arranged on each of the left side and the right side of the effective pixel region. However, the right shaded pixel 390 is omitted in the drawing. Note that the positions of the shaded pixels 390 are not limited to those illustrated in the drawing. For example, the shaded pixels 390 of a predetermined number of rows can be arranged on at least one of an upper side and a lower side of the effective pixel region. Furthermore, the shaded pixels 390 can be arranged on at least one sides of the left side and the right side of the effective pixel region, and the upper side and the lower side.

The drive unit 210 (not illustrated) drives the shaded pixel 390 to generate an analog pixel signal corresponding to a dark current as an OPB signal. Note that the OPB signal is an example of a shaded pixel signal defined in the claims.

Furthermore, the drive unit 210 drives each of the effective pixels 221 to generate an analog pixel signal corresponding to the exposure amount as an effective pixel signal. Furthermore, the drive unit 210 drives a specific pixel among the plurality of effective pixels 221, and generates an analog pixel signal according to a dark current as an EOPB (Extra Optical Black) signal. In other words, a specific pixel among the effective pixels 221 generates the EOPB signal in addition to the effective pixel signal, and the remaining pixels generate only the effective pixel signal. The former effective pixel is hereinafter referred to as "EOPB pixel". In the drawing, a gray Gb pixel indicates an EOPB pixel. Note that the EOPB signal is an example of an additional shaded pixel signal defined in the claims.

Figure 3:
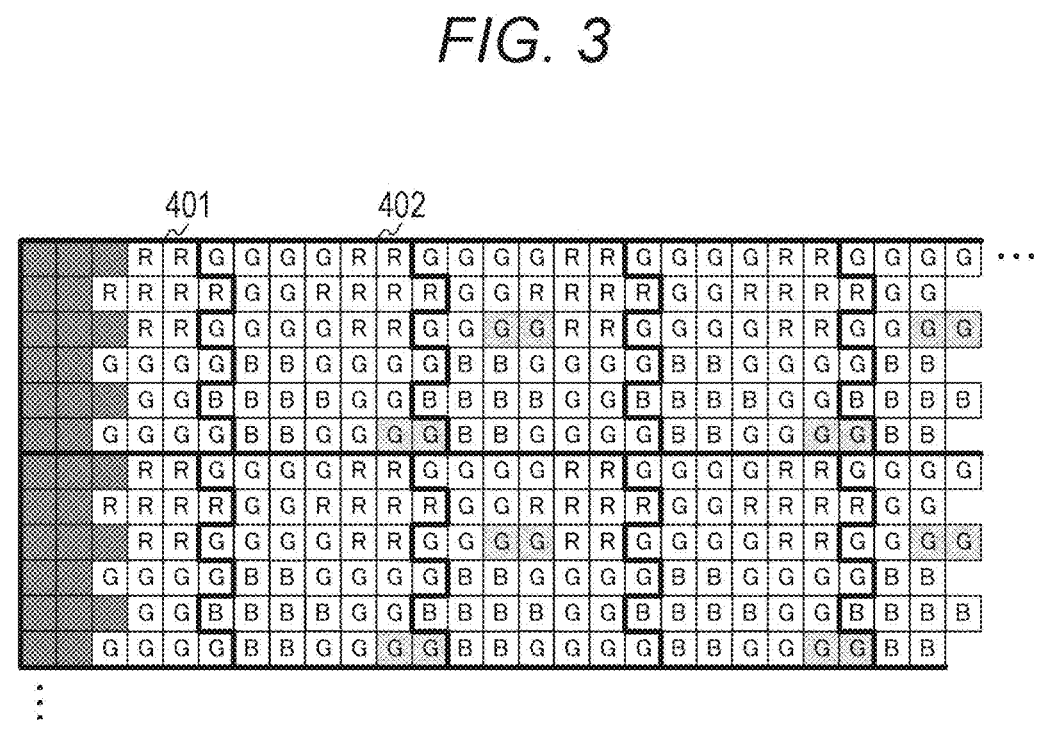

FIG. 3 is a diagram illustrating an example of a correction region according to the first embodiment of the present technology. In the drawing, a gray G pixel indicates an EOPB pixel. The pixel array unit 220 is divided into a plurality of correction regions such as correction regions 401 and 402. In the drawing, regions surrounded by thick lines indicates a correction region.

The correction region 401 includes two pixel blocks and shaded pixels 390 on the left of the two pixel blocks. The effective pixel signal of the effective pixel 221 in the correction region 401 is corrected by the OPB signal of the shaded pixel 390 in the region. A correction region having line symmetry with the correction region 401 is arranged on the right side of the effective pixel region.

The correction region 402 includes four pixel blocks. Furthermore, two EOPB pixels are arranged in the correction region 402. In the drawing, a gray G pixel indicates an EOPB pixel. The effective pixel signal of the effective pixel 221 in the correction region 402 is corrected by the EOPB signal of the EOPB pixel in the region and the OPB signal of each of the shaded pixels 390 on the left side and the right side.

Note that the correction region is not limited to the shape and size illustrated in the drawing, and the shape and size can be arbitrarily changed as necessary.

Here, the drive unit 210 can drive a plurality of adjacent pixels of the same color to generate a signal obtained by adding the pixel signals. This processing is called binning.

FIG. 4 is a diagram illustrating an example of image data obtained when binning is performed according to the first embodiment of the present technology. The drawing illustrates image data in a case where two pixels adjacent in a horizontal direction are added. The signal to noise ratio (SN) ratio and sensitivity can be improved by binning. However, in a case where two pixels adjacent in the horizontal direction are added, a phase difference cannot be obtained, and thus, the phase difference AF cannot be performed.

Note that the drive unit 210 adds two pixels, but the addition number is not limited to two pixels. The G pixels in the decapixel block 300 can be added up to ten pixels. The R pixels or B pixels in the octapixel block 350 can be added up to eight pixels.

[Configuration Example of Decapixel Block]

Figure 5:
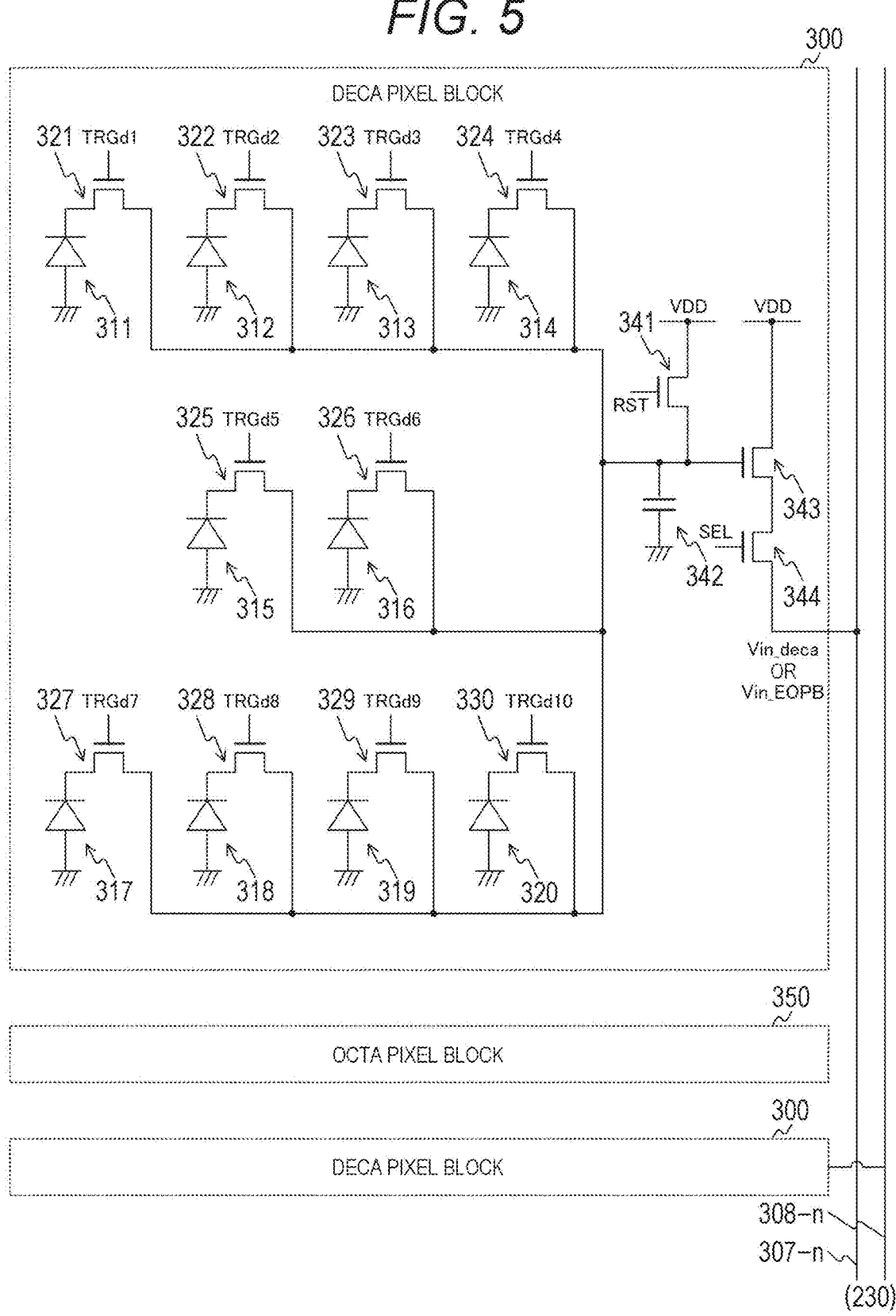
FIG. 5 is a circuit diagram illustrating a configuration example of a decapixel block according to the first embodiment of the present technology.

FIG. 5 is a circuit diagram illustrating a configuration example of the decapixel block 300 according to the first embodiment of the present technology. The decapixel block 300 includes photoelectric conversion elements 311 to 320, transfer transistors 321 to 330, a reset transistor 341, a floating diffusion layer 342, an amplification transistor 343, and a selection transistor 344.

Each of the photoelectric conversion elements 311 to 320 generates a charge by photoelectric conversion. The transfer transistor 321 transfers a charge from the photoelectric conversion element 311 to the floating diffusion layer 342 in accordance with a transfer signal TRGd1 from the drive unit 210. Similarly, the transfer transistors 322 to 330 transfer charges from the photoelectric conversion elements 312 to 320 to the floating diffusion layer 342 in accordance with transfer signals TRGd2 to TRGd10 from the drive unit 210.

The reset transistor 341 initializes the floating diffusion layer 342 in accordance with a reset signal RST from the drive unit 210. The floating diffusion layer 342 accumulates charges and generates a voltage corresponding to the charge amount. The amplification transistor 343 amplifies a voltage of the floating diffusion layer 342. The selection transistor 344 outputs an analog signal amplified by the amplification transistor 343 to a vertical signal line in accordance with a selection signal SEL from the drive unit 210.

In the pixel array unit 220, in a case where the EOPB pixels are arranged in a column of a certain decapixel block 300, assuming that the column is an n-th (n is an integer) column, two vertical signal lines 307-n and 308-n are wired. Half (such as odd-numbered) of the decapixel block 300 in the column is connected to the vertical signal line 307-n, and the rest is connected to the vertical signal line 308-n.

On the other hand, in a case where the EOPB pixel is not arranged in the column of the decapixel block 300, one of the vertical signal lines 307-n is wired in the column.

The effective pixel signals of the effective pixels in the decapixel block 300 are Vin_deca. Furthermore, the EOPB pixel among the effective pixels generates an EOPB signal in addition to the effective pixel signal Vin_deca. The EOPB signal is set as Vin_EOPB.

As illustrated in the drawing, ten pixels in the decapixel block 300 share the floating diffusion layer 342. Furthermore, in the circuit configuration described above, a level of the pixel signal when the floating diffusion layer 342 is initialized is hereinafter referred to as "P-phase level" or "reset level". Furthermore, a level of the pixel signal when the charge is transferred to the floating diffusion layer 342 is hereinafter referred to as "D-phase level" or "signal level".

[Configuration Example of Octapixel Block]

Figure 6:
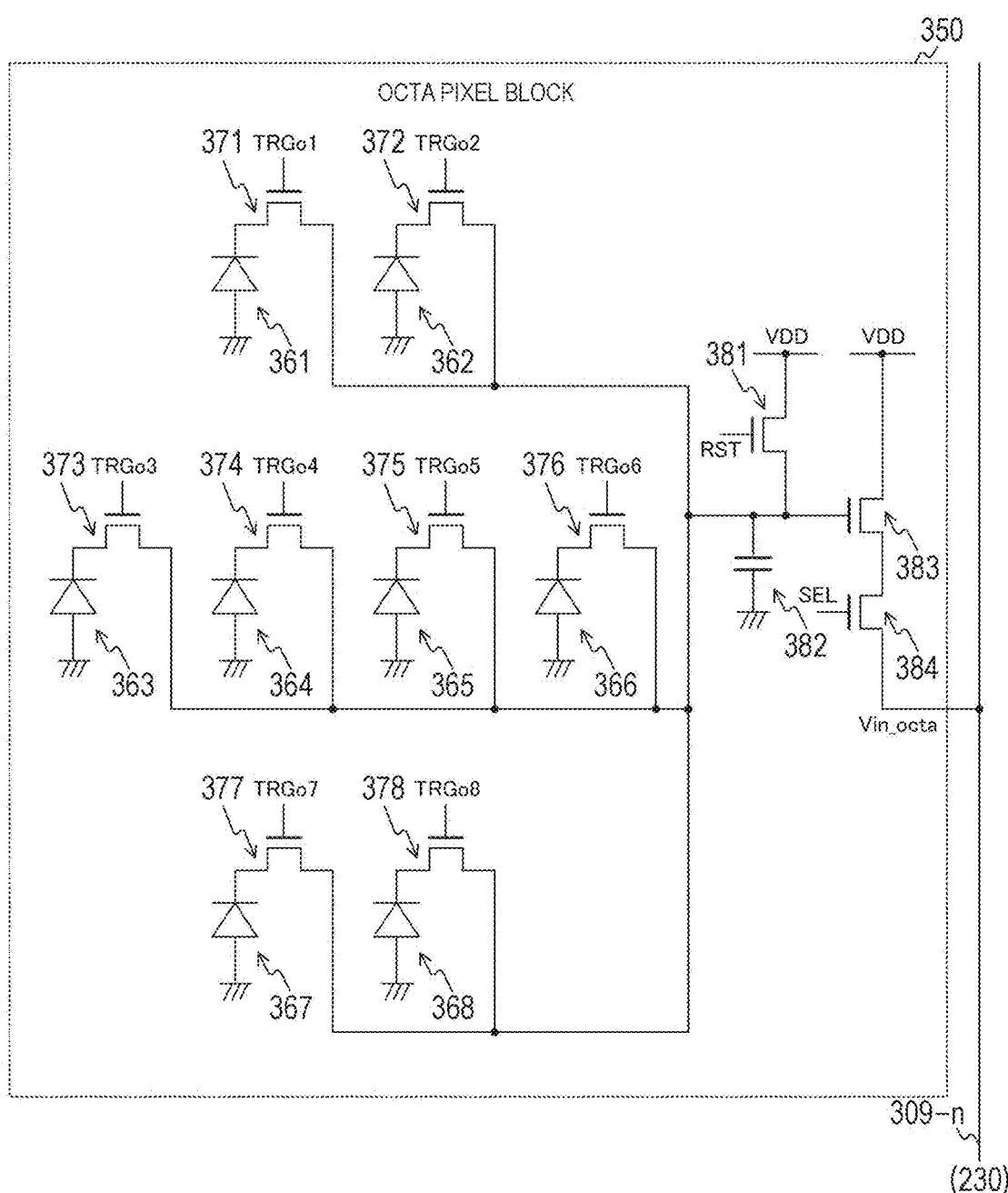
FIG. 6 is a circuit diagram illustrating a configuration example of an octapixel block according to the first embodiment of the present technology.

FIG. 6 is a circuit diagram illustrating a configuration example of the octapixel block 350 according to the first embodiment of the present technology. The octapixel block 350 includes photoelectric conversion elements 361 to 368, transfer transistors 371 to 378, a reset transistor 381, a floating diffusion layer 382, an amplification transistor 383, and a selection transistor 384.

The circuit configuration of the octapixel block 350 is similar to that of the decapixel block 300 illustrated in FIG. 5 except that the number of photoelectric conversion elements and the number of transfer transistors are 8. That is, the eight pixels in the octapixel block 350 share the floating diffusion layer 382.

Furthermore, a vertical signal line 309-n is wired for each column of the octapixel block 350, and an effective pixel signal Vin_octa is transmitted.

[Configuration Example of Shaded Pixel]

Figure 7:
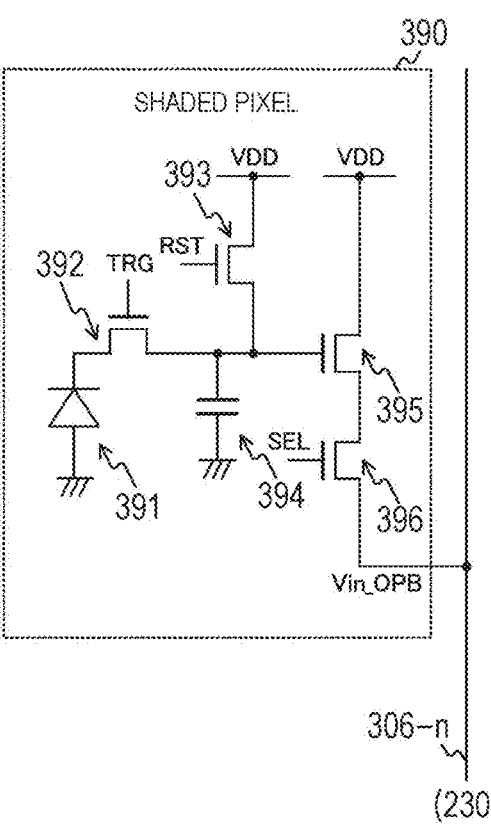
FIG. 7 is a circuit diagram illustrating a configuration example of a shaded pixel according to the first embodiment of the present technology.

FIG. 7 is a circuit diagram illustrating a configuration example of the shaded pixel 390 according to the first embodiment of the present technology. The shaded pixel 390 includes a photoelectric conversion element 391, a transfer transistor 392, a reset transistor 393, a floating diffusion layer 394, an amplification transistor 395, and a selection transistor 396. The circuit configuration of the shaded pixel 390 is similar to that of the decapixel block 300 illustrated in FIG. 5 except that the floating diffusion layer 394 is not shared by a plurality of pixels. Furthermore, a vertical signal line 306-n is wired for each column of the shaded pixels 390, and an OPB signal Vin_OPB is transmitted.

[Configuration Example of Reading Unit]

Figure 8:
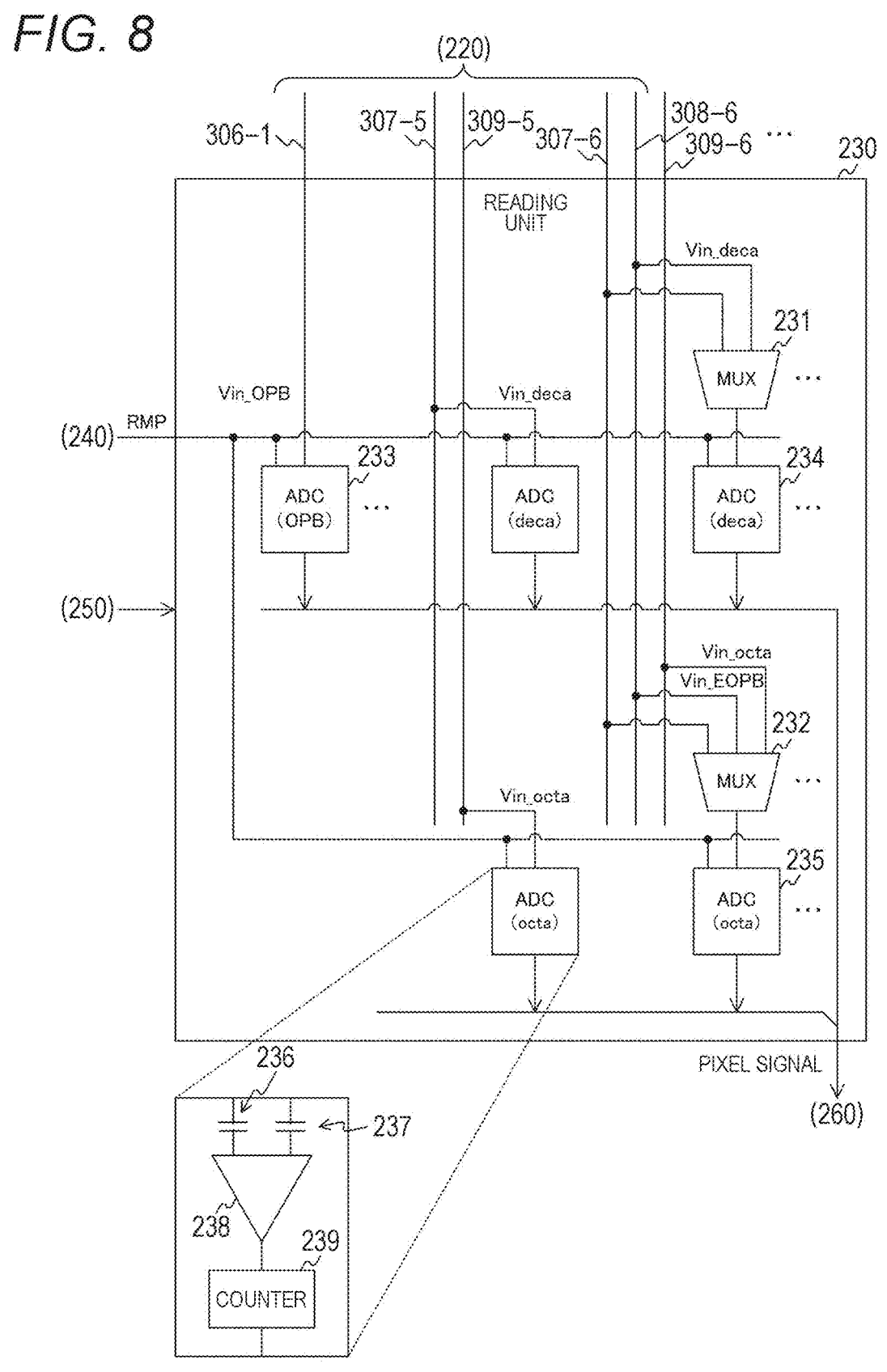

FIG. 8 is a block diagram illustrating a configuration example of the reading unit 230 according to the first embodiment of the present technology. The reading unit 230 includes multiplexers 231 and 232 and analog-to-digital converters (ADCs) 233, 234, and 235.

In the pixel array unit 220, a vertical signal line 306-n is wired for each column of the shaded pixels 390. Furthermore, vertical signal lines 307-n and 309-n are wired for each column of the pixel block in which the EOPB pixel is not arranged. Among these, the decapixel block 300 is connected to the vertical signal line 307-$n$, and the octapixel block 350 is connected to a vertical signal line 309-$n$. Furthermore, vertical signal lines 307-$n$, 308-$n$, and 309-$n$ are wired for each column of the pixel block in which the EOPB pixels are arranged. Half of the decapixel block 300 in the column is connected to the vertical signal line 307-$n$, and the other half is connected to the vertical signal line 308-$n$.

Furthermore, the ADC 233 is arranged for each column of the shaded pixels 390. The ADCs 234 and 235 are arranged for each column of the pixel block. The multiplexers 231 and 232 are arranged for each column of the pixel block in which the EOPB pixels are arranged.

The ADC 233 converts the analog OPB signal Vin_OPB from the vertical signal line 306-$n$ into a digital signal.

In a column of the pixel block in which the OPB pixel is not arranged, the ADC 234 converts the analog effective pixel signal Vin_deca from the vertical signal line 307-$n$ into a digital signal. Furthermore, in the column, the ADC 234 converts the analog effective pixel signal Vin_octa from the vertical signal line 309-$n$ into a digital signal.

Furthermore, in the column of the pixel block in which OPB pixels are arranged, the multiplexer 231 connects one of the vertical signal lines 307-$n$ and 308-$n$ to the ADC 234 under the control of the timing control unit 250. In the column, the multiplexer 232 connects any one of the vertical signal lines 307-$n$, 308-$n$, and 309-$n$ to the ADC 235 under the control of the timing control unit 250. The ADC 234 converts the effective pixel signal Vin_deca from the multiplexer 231 into a digital signal. Furthermore, the ADC 235 converts the effective pixel signal Vin_octa or the EOPB signal Vin_EOPB from the multiplexer 232 into a digital signal.

The AD-converted pixel signal (effective pixel signal, OPB signal, or EOPB signal) is supplied to the signal processing unit 260.

Furthermore, the ADC 235 includes, for example, capacitors 236 and 237, a comparator 238, and a counter 239. The circuit configurations of the ADCs 233 and 234 are similar to those of the ADC 235.

The reference signal RMP from the reference signal generation unit 240 and the analog signal from the corresponding column are input to the comparator 238 through the capacitors 236 and 237. The comparator 238 compares the signals and supplies a comparison result to the counter 239.

The counter 239 counts a count value over a period until the comparison result is inverted. The counter 239 outputs a digital signal indicating a count value.

Here, the counter 239 counts down (or counts up) the count value when converting a P-phase level (reset level), and counts up (or counts down) when converting the D-phase level (signal level). As a result, the CDS processing for obtaining the difference between the P-phase level and the D-phase level can be realized. Note that the counter 239 may be configured to perform only one of up counting and down counting, and the CDS processing may be performed by a subsequent circuit.

Note that two ADCs are arranged for each column of the pixel block, but the present technology is not limited to this configuration. One ADC may be arranged for each column of the pixel block, or three or more ADCs may be arranged for each column. With an increase in the number of ADCs, a speed of AD conversion can be increased, and a frame rate can be improved.

[Configuration Example of Signal Processing Unit]

Figure 9:
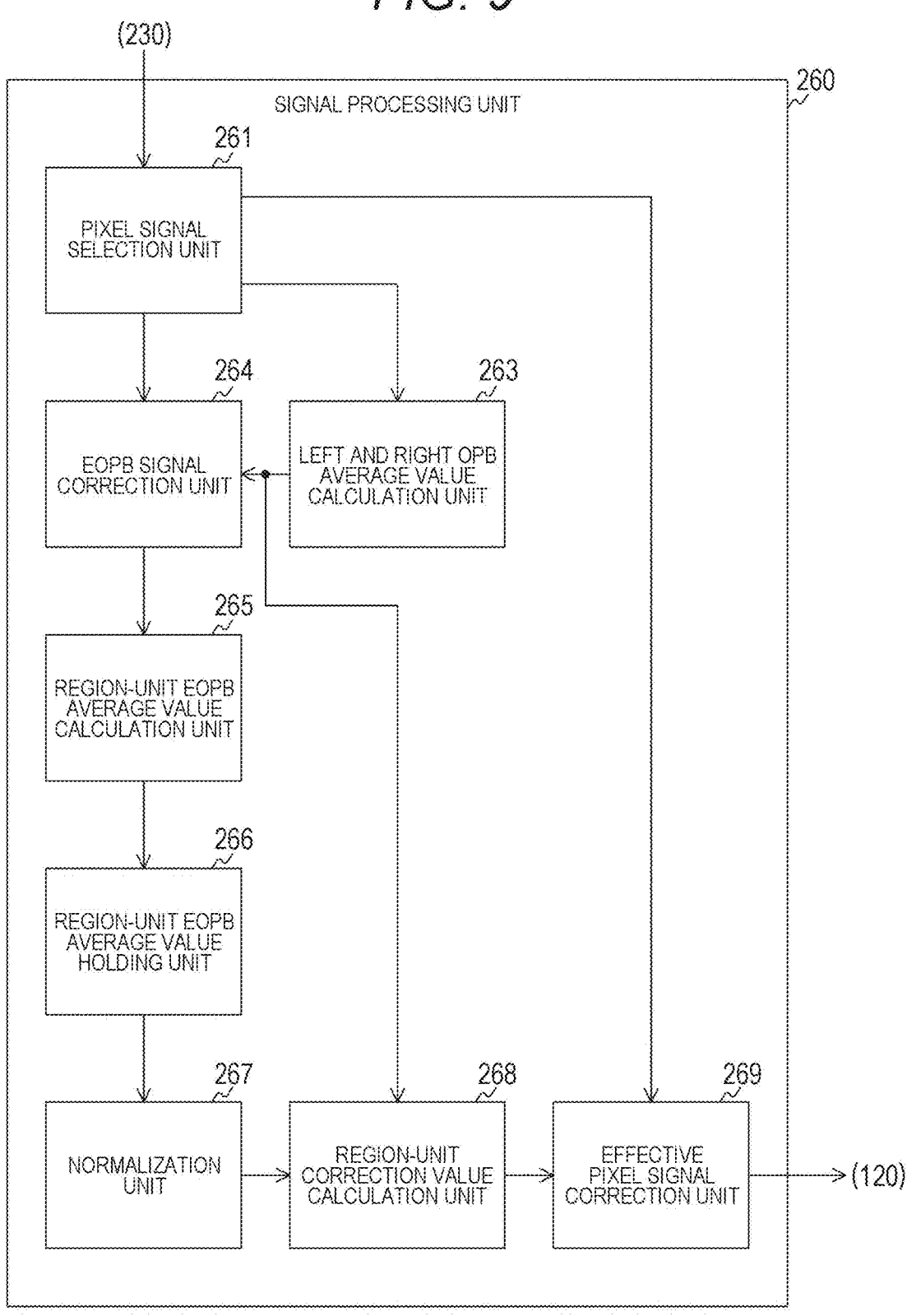
FIG. 9 is a block diagram illustrating a configuration example of a signal processing unit according to the first embodiment of the present technology.

FIG. 9 is a block diagram illustrating a configuration example of the signal processing unit 260 according to the first embodiment of the present technology. The signal processing unit 260 includes a pixel signal selection unit 261, a left and right OPB average value calculation unit 263, an EOPB signal correction unit 264, and a region-unit EOPB average value calculation unit 265. Furthermore, the signal processing unit 260 further includes a region-unit EOPB average value holding unit 266, a normalization unit 267, a region-unit correction value calculation unit 268, and an effective pixel signal correction unit 269.

The pixel signal selection unit 261 selects the EOPB signal and the OPB signal among the AD-converted pixel signals from the reading unit 230, and supplies the EOPB signal and the OPB signal to the EOPB signal correction unit 264 and the left and right OPB average value calculation unit 263. Furthermore, the pixel signal selection unit 261 selects an effective pixel signal and supplies the effective pixel signal to the effective pixel signal correction unit 269.

The left and right OPB average value calculation unit 263 calculates, for each row of the correction region, an average value of the OPB signals on the left and right sides of the row. In a case where the correction region of a range illustrated in FIG. 3 is set, the shaded pixels 390 of six rows are arrayed for each row of the correction region, so that an average value of the OPB signals of six rows is calculated.

The left and right OPB average value calculation unit 263 supplies an average value calculated for the correction region of an i-th row as HOPB_AVE$_i$ to the EOPB signal correction unit 264 and the region-unit correction value calculation unit 268. Here, i is an integer from 1 to I. I is the number of rows of the correction region.

The EOPB signal correction unit 264 corrects the EOPB signal using the average value HOPB_AVE$_i$ of the OPB signal. For example, a process of subtracting the corresponding average value HOPB_AVE$_i$ from the EOPB signal is executed as the correction processing. This makes it possible to remove lateral pulling noise of the EOPB pixel. The EOPB signal correction unit 264 supplies the corrected EOPB signal to the region-unit EOPB average value calculation unit 265.

The region-unit EOPB average value calculation unit 265 calculates, for each correction region, an average value of the EOPB signals after correction in the region. The region-unit EOPB average value calculation unit 265 supplies the average value calculated for the correction region of the i-th row and the j-th column as EOPB_AVE$_{ij}$ to the region-unit EOPB average value holding unit 266. Here, j is an integer of 1 to J. J is the number of columns of the correction region.

The region-unit EOPB average value holding unit 266 holds an average value EOPB_AVE$_{ij}$ for each correction region. In a case where the total number of correction regions in the pixel array unit 220 is I×J, I×J average values EOPB_AVE$_{ij}$ are held. The average value EOPB_AVE$_{ij}$ calculated for a certain frame is held until a next frame is imaged.

The normalization unit 267 normalizes the average value EOPB_AVE$_{ij}$. For example, Min-Max normalization with a maximum value of 1 and a minimum value of 0 is executed. The normalization unit 267 supplies the average value EOPB_AVE$_{ij}$ normalized to 0 to 1 to the region-unit correction value calculation unit 268 as a correction coefficient c$_{ij}$.

The region-unit correction value calculation unit 268 calculates the correction value for each correction region using the correction coefficient c$_{ij}$ obtained from the previous frame and the average value HOPB_AVE$_i$ of the OPB signal of the current frame. The correction value $D_{ij}$ of the correction region of the i-th row and the j-th column is calculated by, for example, the following expression.

$$D_{ij} = HOPB\_AVE_i \times c_{ij}$$

The region-unit correction value calculation unit 268 supplies the calculated correction value $D_{ij}$ to the effective pixel signal correction unit 269.

The effective pixel signal correction unit 269 corrects the effective pixel signal of the current frame using the correction value $D_{ij}$. For example, a process of subtracting the correction value $D_{ij}$ from the effective pixel signal in the correction region of the i-th row and the j-th column is executed as the correction processing. Image data (frames) in which the corrected effective pixel signals are arranged is output to the recording unit 120.

Note that the EOPB signal correction unit 264 can also correct the EOPB signal by a value obtained by linearly interpolating the black level corresponding to the column of the correction region from the average value of the left OPB signal and the average value of the right OPB signal. In this case, the region-unit correction value calculation unit 268 multiplies the linearly interpolated value by the correction coefficient $c_{ij}$ to obtain the correction value.

As the number of EOPB pixels in the pixel array unit 220 is larger, shading of a high frequency component is more easily removed, but since the number of pixels to be read is larger, the frame rate is reduced. Conversely, the smaller the number of pixels of the EOPB pixel, the more difficult it is to remove noise such as shading that tends to be in-plane, but the amount of decrease in the frame rate at which the number of pixels to be read decreases becomes small.

Furthermore, the effective pixel signal of the current frame is corrected using the EOPB signal of the previous frame, so that a memory for holding the effective pixel signal becomes unnecessary.

Note that the effective pixel signal of the current frame can be corrected using the EOPB signal of the current frame. In this case, for example, the average value $EOPB\_AVE_{ij}$ for M (M is an integer) rows of the correction region is held in the region-unit EOPB average value holding unit 266. Furthermore, as illustrated in FIG. 10, the effective pixel signal holding unit 262 (memory or the like) that holds the effective pixel signals is required until the correction values for M rows are calculated.

As illustrated in FIG. 9, in a case where the method of normalizing the average value $EOPB\_AVE_{ij}$ of the entire region of the previous frame to obtain the correction coefficient is used, the signal processing unit 260 can perform correction reflecting a non-linear noise tendency of the entire region. However, in a case where noise having a small correlation between the previous frame and the current frame occurs, noise may not be removed.

On the other hand, as illustrated in FIG. 10, in a case where the method of normalizing the average value $EOPB\_AVE_{ij}$ of M rows of the current frame to obtain the correction coefficient is used, noise having a small correlation between the previous frame and the current frame can be removed. However, since the nonlinear noise tendency in the entire region cannot be reflected, the shading correction in the vertical direction is limited.

Figure 11:
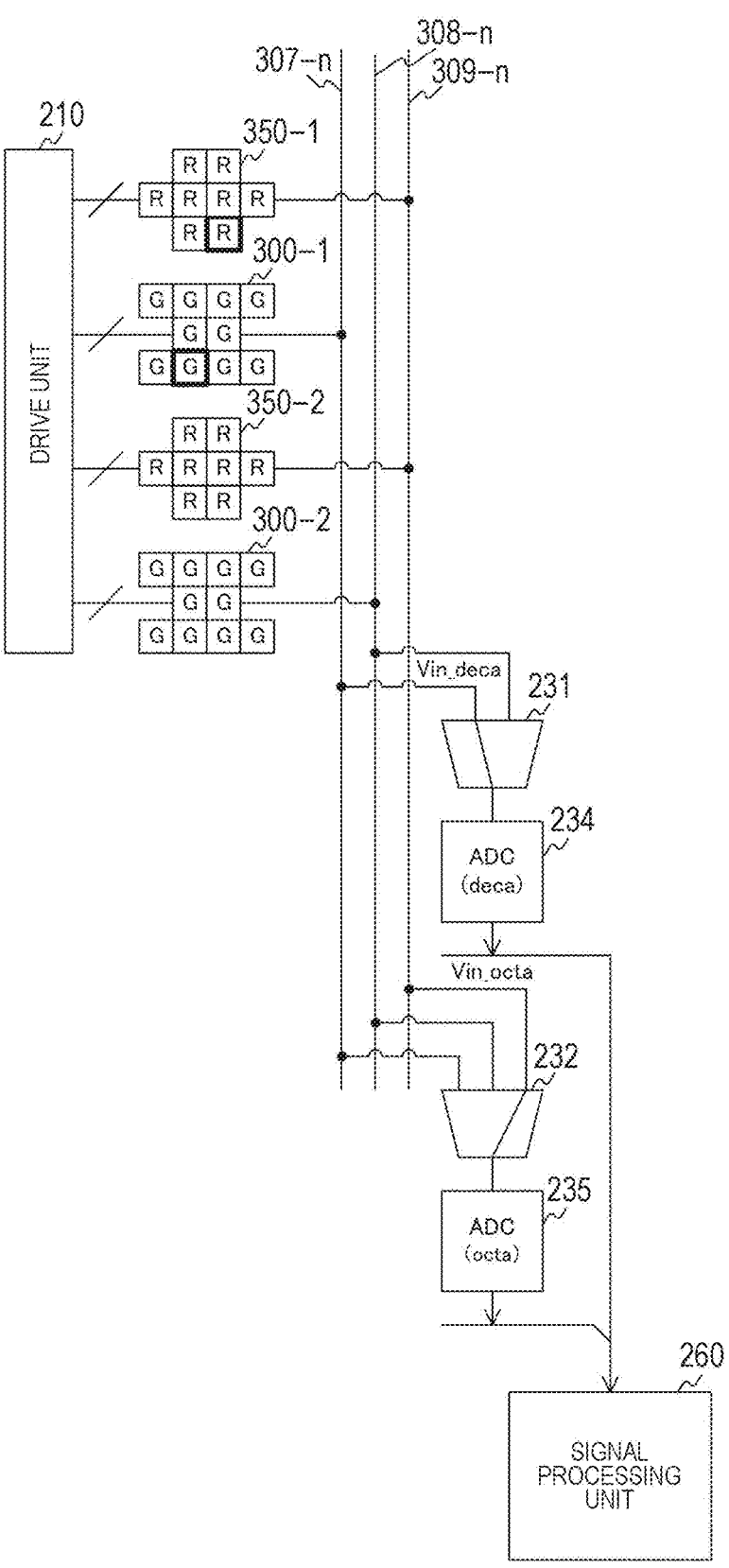
FIG. 11 is a diagram illustrating an example of a state of a solid-state imaging element when an effective pixel signal is converted into a digital signal according to the first embodiment of the present technology.

FIG. 11 is a diagram illustrating an example of a state of the solid-state imaging element 200 when an effective pixel signal is converted into a digital signal according to the first embodiment of the present technology. In the n-th column of the pixel block, for example, it is assumed that an octapixel block 350-1, a decapixel block 300-1, an octapixel block 350-2, and a decapixel block 300-2 are arranged.

Furthermore, it is assumed that EOPB pixels are arranged in the decapixel blocks 300-1 and 300-2. Furthermore, the decapixel block 300-1 is connected to the vertical signal line 307-n, and the decapixel block 300-2 is connected to the vertical signal line 308-n. The octapixel blocks 350-1 and 350-2 are connected to the vertical signal line 309-n.

The drive unit 210 sequentially drives the first to eighth effective pixels in the octapixel block 350-1 to generate an effective pixel signal Vin_octa. In the drawing, pixels surrounded by thick lines indicate pixels to be driven. At the same time, the drive unit 210 sequentially drives the first to eighth effective pixels in the decapixel block 300-1, and generates an effective pixel signal Vin_deca.

The multiplexer 231 connects the vertical signal line 307-n to the ADC 234, and the ADC 234 converts the effective pixel signal Vin_deca into a digital signal. The multiplexer 232 connects the vertical signal line 309-n to the ADC 235, and the ADC 235 converts the effective pixel signal Vin_octa into a digital signal.

Figure 12:
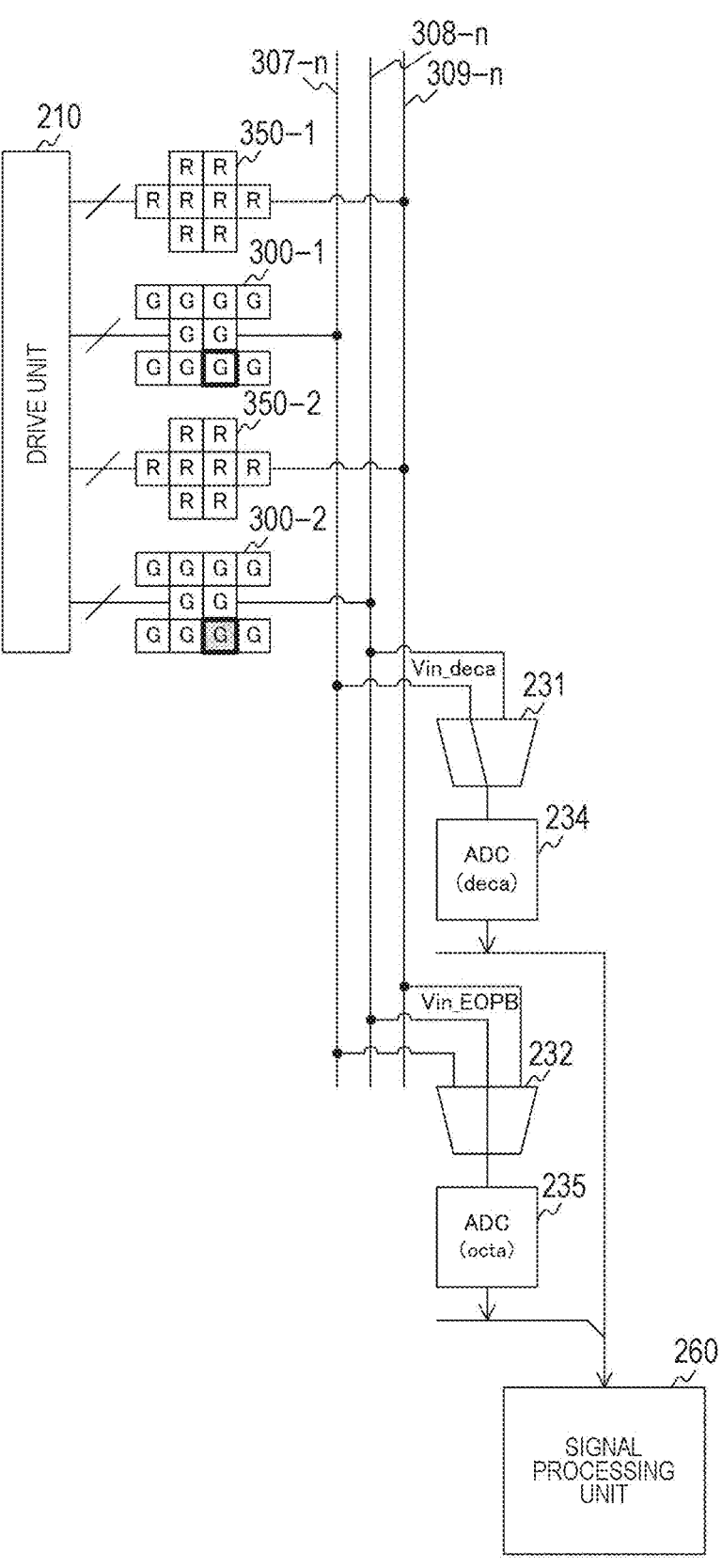
FIG. 12 is a diagram illustrating an example of a state of the solid-state imaging element when an effective pixel signal and an EOPB signal are converted into digital signals according to the first embodiment of the present technology.

FIG. 12 is a diagram illustrating an example of a state of the solid-state imaging element 200 when an effective pixel signal and an EOPB signal are converted into digital signals according to the first embodiment of the present technology. The drive unit 210 drives the ninth effective pixel in the decapixel block 300-1 and generates an effective pixel signal Vin_deca. On the other hand, since the octapixel block 350-1 has eight pixels, in a case where there is no EOPB pixel, there is no AD conversion target of the ADC 235, and a surplus occurs in the processing capability of the ADC 235.

Therefore, the drive unit 210 drives an effective pixel in the decapixel block 300-2 as an EOPB pixel and generates an EOPB signal Vin_EOPB. The multiplexer 232 connects the vertical signal line 308-n to the ADC 235, and the ADC 235 converts the EOPB signal Vin_EOPB into a digital signal.

Note that AD conversion of the EOPB signal of the EOPB pixel in the decapixel block 300-1 is executed at the time of AD conversion of the ninth and tenth effective pixel signals in the decapixel block 300-2.

As illustrated in the drawing, since the EOPB signal is AD-converted using the surplus of the processing capability of the ADC 235, it is possible to maintain the same frame rate as in a case where the EOPB signal is not generated.

As illustrated in FIGS. 11 and 12, a plurality of effective pixels that is not shaded from light is arranged in the pixel array unit 220. The drive unit 210 performs control to drive each of the plurality of effective pixels to generate an analog signal according to the exposure amount as an effective pixel signal and control to drive the EOPB pixel among the plurality of effective pixels to generate an analog signal according to the dark current as an EOPB signal. The signal processing unit 260 corrects (that is, dark correction) the effective pixel signal using the OPB signal and the EOPB signal. The dark correction is performed using the EOPB signal in the effective pixel region, the black shift locally generated in the effective pixel region can be corrected.

Furthermore, the pixel array unit 220 includes a decapixel block 300 in which ten effective pixels sharing a floating diffusion layer are arranged, and an octapixel block 350 in which eight effective pixels sharing a floating diffusion layer are arranged. The drive unit 210 drives effective pixels in the decapixel block 300 as EOPB pixels.

Furthermore, the ADC 234 converts an effective pixel signal from an effective pixel in the decapixel block 300 into a digital signal. The ADC 235 converts each of the effective pixel signal from the effective pixel in the octapixel block 350 and the EOPB signal from the EOPB pixel in the decapixel block 300 into a digital signal. Note that the ADC 234 is an example of a first analog-to-digital converter defined in the claims, and the ADC 235 is an example of a second analog-to-digital converter defined in the claims.

Figure 13:
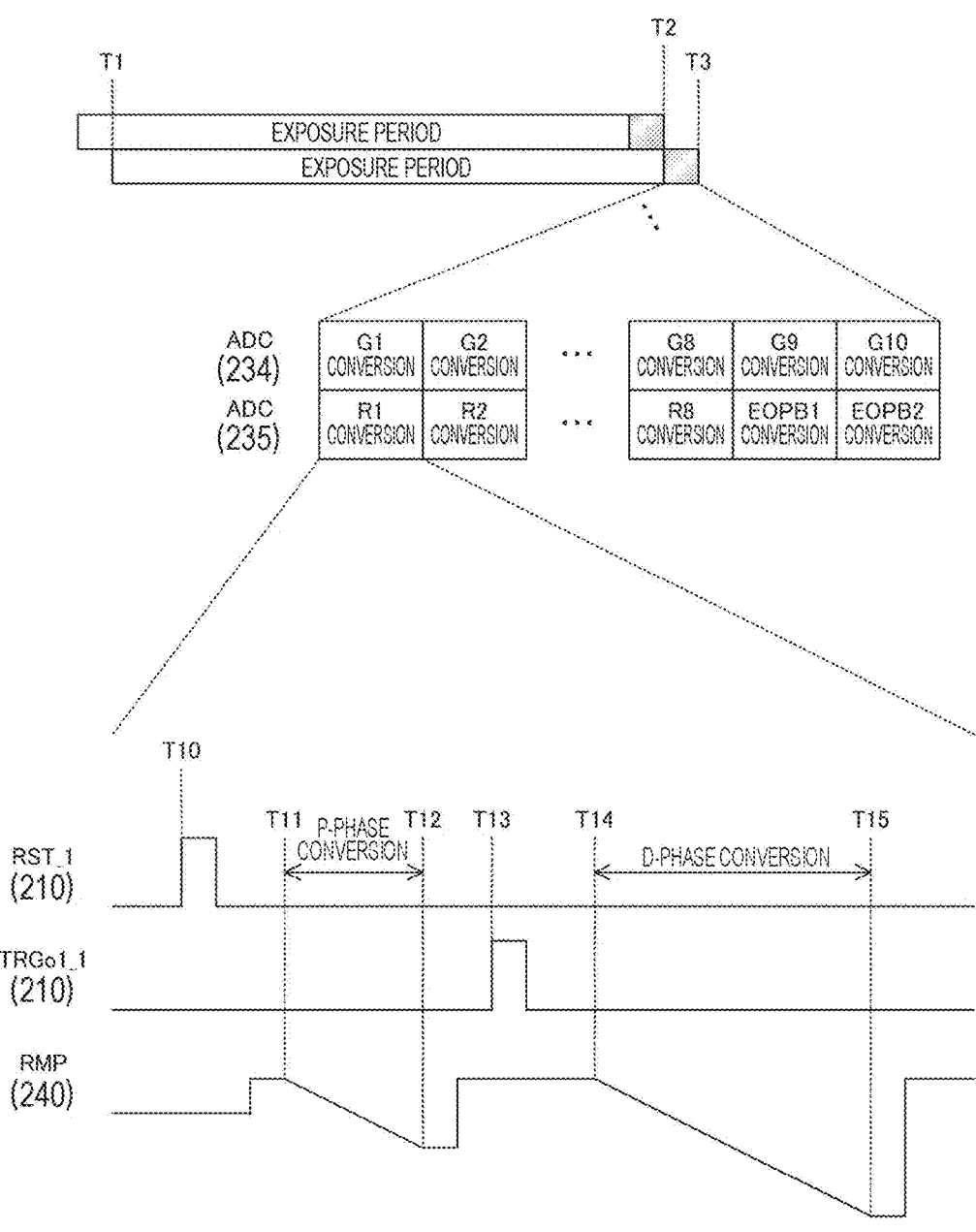
FIG. 13 is a timing chart illustrating an example of a method of driving pixels when the effective pixel signals are read according to the first embodiment of the present technology.

FIG. 13 is a timing chart illustrating an example of a method of driving a pixel when an effective pixel signal is read according to the first embodiment of the present technology. As described above, since the two ADCs are arranged for each column of the pixel block, the reading unit 230 can read the rows of the pixel block in units of two rows. An exposure start timing of two rows is set to T1, and an exposure end timing is set to T3.

At the start of exposure, the transfer transistor and the reset transistor in the read target pixel block are controlled to an on state. As a result, the charge of the floating diffusion layer is released, and the influence of blooming can be excluded.

During a period from timing T2 immediately before timing T3 to timing T3, the ADC 234 sequentially performs AD conversion on effective pixel signals of ten G pixels in the decapixel block 300-1 to be read in synchronization with a horizontal synchronization signal. In the drawing, "G1" to "G10" indicate first to tenth G pixels.

Furthermore, the ADC 235 sequentially performs AD conversion on the effective pixel signals of the eight R pixels (or B pixels) in the octapixel block 350-1 to be read in order in synchronization with the horizontal synchronization signal. In the drawing, "R1" to "R8" indicate first to eighth R pixels.

Within a cycle of the horizontal synchronization signal, the drive unit 210 supplies a reset signal RST_1 to the octapixel block 350-1 from timing T10 over a pulse period, and initializes the floating diffusion layer of the block. The reference signal generation unit 240 gradually decreases the reference signal RMP within a period from timing T11 to timing T12 immediately thereafter. During this period, the P-phase level (reset level) of the effective pixel signal is AD-converted.

Then, the drive unit 210 supplies a transfer signal TRGo1_1 to the octapixel block 350-1 from timing T13 over a pulse period, and transfers the charge of a first R pixel to the floating diffusion layer. The reference signal generation unit 240 gradually decreases the reference signal RMP within a period from timing T14 to timing T15 immediately thereafter. During this period, the D-phase level (signal level) of the effective pixel signal is AD-converted. The reading unit 230 performs CDS processing of obtaining a difference between the P-phase level and the D-phase level, and outputs the processed effective pixel signal.

Figure 14:
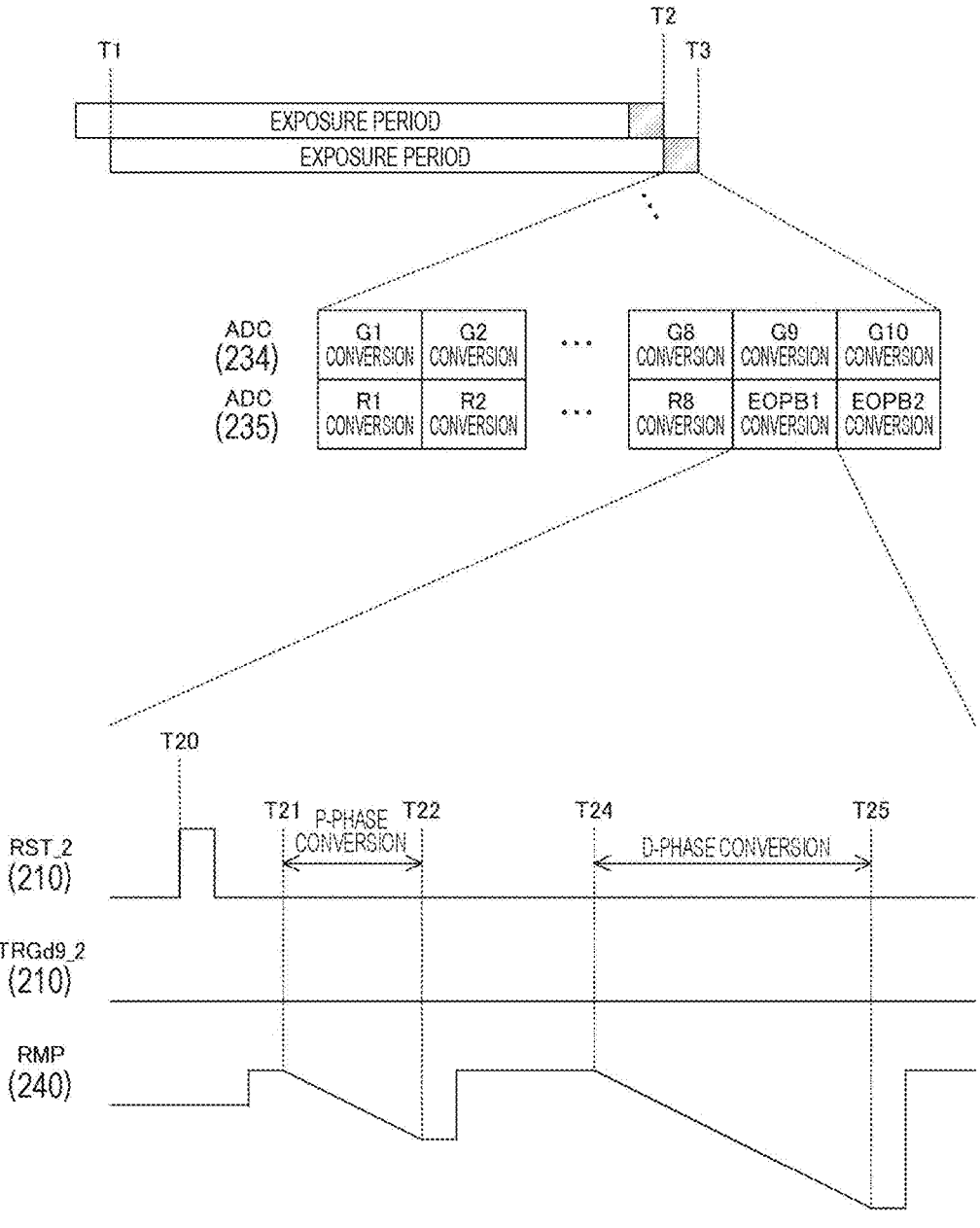
FIG. 14 is a timing chart illustrating an example of a method of driving the pixels when EOPB signals are read according to the first embodiment of the present technology.

FIG. 14 is a timing chart illustrating an example of a method of driving a pixel when an EOPB signal is read according to the first embodiment of the present technology. While the ADC 234 performs AD conversion on the ninth and tenth G pixels in the decapixel block 300-1, the ADC 235 performs AD conversion on the EOPB signals of the two EOPB pixels in the decapixel block 300-2.

Within the cycle of the horizontal synchronization signal, the drive unit 210 supplies a reset signal RST_2 to the decapixel block 300-2 from timing T20 over a pulse period, and initializes the floating diffusion layer of the block. The reference signal generation unit 240 gradually decreases the reference signal RMP within a period from timing T21 to timing T22 immediately thereafter. During this period, the P-phase level (reset level) of the EOPB signal is AD-converted.

Then, the reference signal generation unit 240 gradually decreases the reference signal RMP within the period from timing T24 to timing T25. During this period, the D-phase level (signal level) of the EOPB signal is AD-converted. Between timing T22 and timing T24, the transfer signal is not supplied to the decapixel block 300-2.

As illustrated in the drawing, the transfer transistor is turned off, so that the EOPB pixel can generate the EOPB signal corresponding to the OPB signal of the shaded pixel 390 regardless of whether the EOPB pixel is not shaded from light.

Note that, although the EOPB pixel is arranged in the decapixel block 300, the EOPB pixel may be arranged in the octapixel block 350. However, in this case, since the ADC 234 cannot perform the AD conversion on the EOPB signal while the ADC 235 is performing the AD conversion on the ninth and tenth effective pixel signals, a frame rate decreases.

Figure 15:
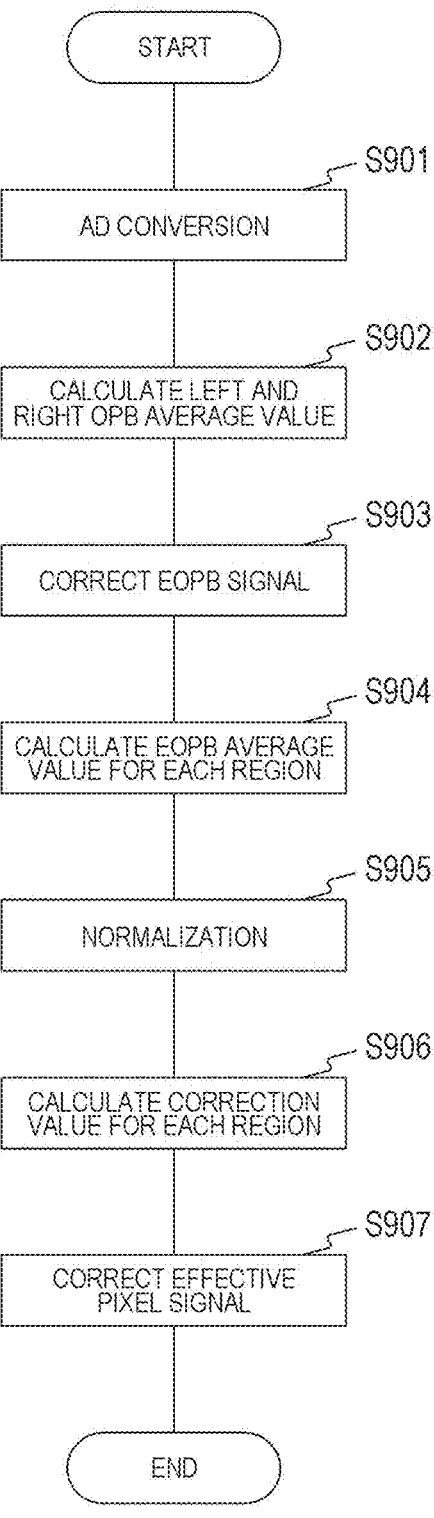
FIG. 15 is a flowchart illustrating an example of operation of the solid-state imaging element according to the first embodiment of the present technology.

FIG. 15 is a flowchart illustrating an example of the operation of the solid-state imaging element 200 according to the first embodiment of the present technology. The operation of the solid-state imaging element 200 is started, for example, when a predetermined application for imaging a frame is executed.

The reading unit 230 in the solid-state imaging element 200 performs AD conversion on each of the pixel signals (Step S901). For each row of the correction region, the signal processing unit 260 calculates an average value of the OPB signals on the left side and the right side of the row (Step S902), and corrects the EOPB signal using the average value (Step S903). For each correction region, the signal processing unit 260 calculates an average value of the EOPB signals after correction in the region (Step S904) and normalizes the average value (Step S905).

Then, the signal processing unit 260 calculates a correction value for each correction region (Step S906), and corrects the effective pixel signal with the correction value (Step S907). After Step S907, the solid-state imaging element 200 performs various types of processing as necessary, and ends the operation for imaging.

Note that, in a case where a plurality of images is continuously captured, Steps S901 to S907 are repeatedly executed in synchronization with the vertical synchronization signal.

As described above, according to the first embodiment of the present technology, since the solid-state imaging element 200 corrects the effective pixel signal using the EOPB signal from the EOPB pixel among the effective pixels, it is possible to correct the black shift locally generated in the effective pixel region and improve the image quality of the image data.

2. SECOND EMBODIMENT

In the first embodiment described above, the decapixel block 300 and the octapixel block 350 are arranged in the pixel array unit 220, but other pixel blocks may be arranged in the pixel array unit 220. A pixel array unit 220 of the third embodiment is different from that of the first embodiment in that a pixel block including four pixels is arranged.

Figure 16:
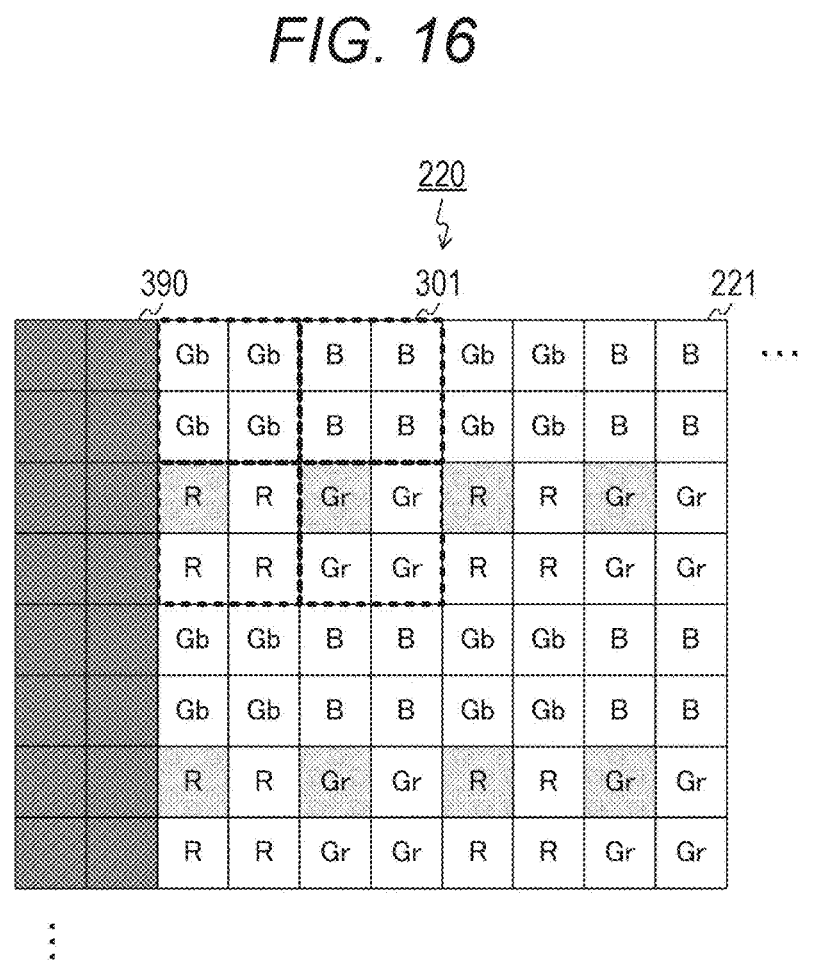

FIG. 16 is an example of a plan view of the pixel array unit 220 according to the second embodiment of the present technology. The pixel array unit 220 of the second embodiment is different from that of the first embodiment in that pixel blocks 301 are arranged instead of the decapixel block 300 and the octapixel block 350.

In the pixel block 301, four pixels of the same color of 2 rows×2 columns sharing a floating diffusion layer are arranged. In the horizontal direction, a pixel block 301 including Gb pixels and a pixel block 301 including B pixels are alternately arrayed.

Alternatively, a pixel block 301 including Gr pixels and a pixel block 301 including R pixels are alternately arrayed in the horizontal direction. Such an array is referred to as a quad Bayer array.

Note that the arrangement of the pixel array unit 220 is not limited to the quad Bayer arrangement in which four pixels are arranged for each pixel block. It is also possible to arrange five or more pixels (nine pixels of three rows×three columns, or the like) for each pixel block.

The circuit configuration of the pixel block 301 is similar to the circuit configuration illustrated in FIGS. 5 and 6 except that the number of pixels is different.

Furthermore, for example, the EOPB pixel is arranged at a predetermined position in the pixel block 301 including the R pixel and a predetermined position in the pixel block 301 including the Gr pixel. In the drawing, a gray pixel indicates an EOPB pixel.

Figure 17:
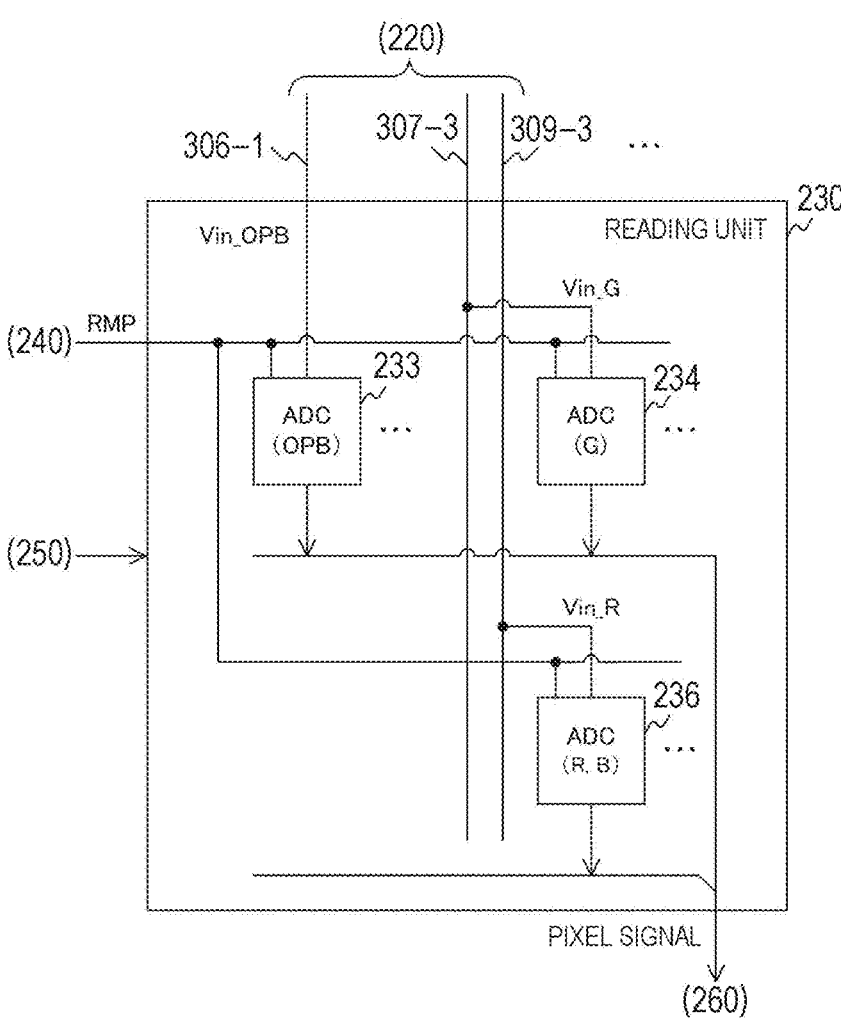
FIG. 17 is a block diagram illustrating a configuration example of a reading unit according to the second embodiment of the present technology.

FIG. 17 is a block diagram illustrating a configuration example of the reading unit 230 according to the second embodiment of the present technology. The reading unit 230 of the second embodiment is different from that of the first embodiment in that the multiplexers 231 and 232 are not arranged.

FIGS. 18A and 18B are diagrams illustrating a pixel driving method according to the second embodiment of the present technology. FIG. 18A in the drawing illustrates an example of a frame captured for a first time within a 1V period for capturing one composite frame, and FIG. 18B in the drawing illustrates an example of a frame captured for a second time within the period. For example, a cycle of a vertical synchronization signal is set as a length of the 1V period.

Two frames are imaged within the 1V period. In a first frame, the drive unit 210 causes half of the EOPB pixels to generate the EOPB signal, and causes the remaining EOPB pixels to generate the effective pixel signal. Then, in a second frame, the drive unit 210 causes the EOPB pixel that has generated the EOPB signal in the first frame to generate the effective pixel signal, and causes the remaining EOPB pixels to generate the EOPB signal. In the drawing, gray pixels indicate pixels that generate the EOPB signal.

For example, as illustrated in FIG. 18A of the drawing, in a case where attention is paid to a region of 8 rows x 8 columns, the drive unit 210 causes the two R pixels and the two Gr pixels in the third row to generate the EOPB signal, and causes the remaining effective pixels to generate the effective pixel signal. The EOPB pixels are also arranged in the seventh row, but these pixels generate effective pixel signals.

Then, as illustrated in FIG. 18B of the drawing, the drive unit 210 causes the two R pixels and the two Gr pixels in the seventh row to generate EOPB signals, and causes the remaining effective pixels to generate effective pixel signals. The EOPB pixel in the third row generates an effective pixel signal.

The signal processing unit 260 performs dark correction and composition of two frames. As illustrated in the drawing, the drive unit 210 generates a frame by control for driving the EOPB pixel and the remaining effective pixels.

FIGS. 19A, 19B, and 19C are diagrams illustrating an effect of correction in a comparative example. A configuration in which dark correction is performed using only the OPB signal without using the EOPB signal is assumed as a comparative example. FIG. 19A in the drawing illustrates an example of the pixel array unit 220 of the comparative example. FIG. 19B in the drawing is a graph illustrating an example of the noise intensity and the correction value for each column in a case where no local noise occurs. FIG. 19C in the drawing is a graph illustrating an example of the noise intensity and the correction value for each column in a case where local noise occurs.

As illustrated in FIG. 19A of the drawing, in the comparative example, the shaded pixels 390 are arranged on the left and right of the effective pixel region, but the EOPB pixels are not arranged in the effective pixel region.

A vertical axis of FIGS. 19B and 19C in the drawing represents the noise intensity or the correction value, and a horizontal axis represents the horizontal coordinate. In addition, a solid line indicates the noise intensity for each column, and a dotted line indicates the correction value. A black circle indicates the OPB signal.

As illustrated in FIG. 19B of the drawing, it is assumed that no local noise occurs and the noise intensity of each column is constant in the row. In the comparative example, since the average value of the left and right OPB signals is used as the correction value of each column, the correction value is also constant, and the tendency of the noise and the correction value is similar. Therefore, noise is sufficiently removed by the dark correction.

However, as illustrated in FIG. 19C of the drawing, in a case where local noise occurs and the noise intensity of each column varies non-linearly in the row, tendencies of the noise and the correction value are different at a constant correction value. Therefore, noise cannot be removed.

Figure 20A:
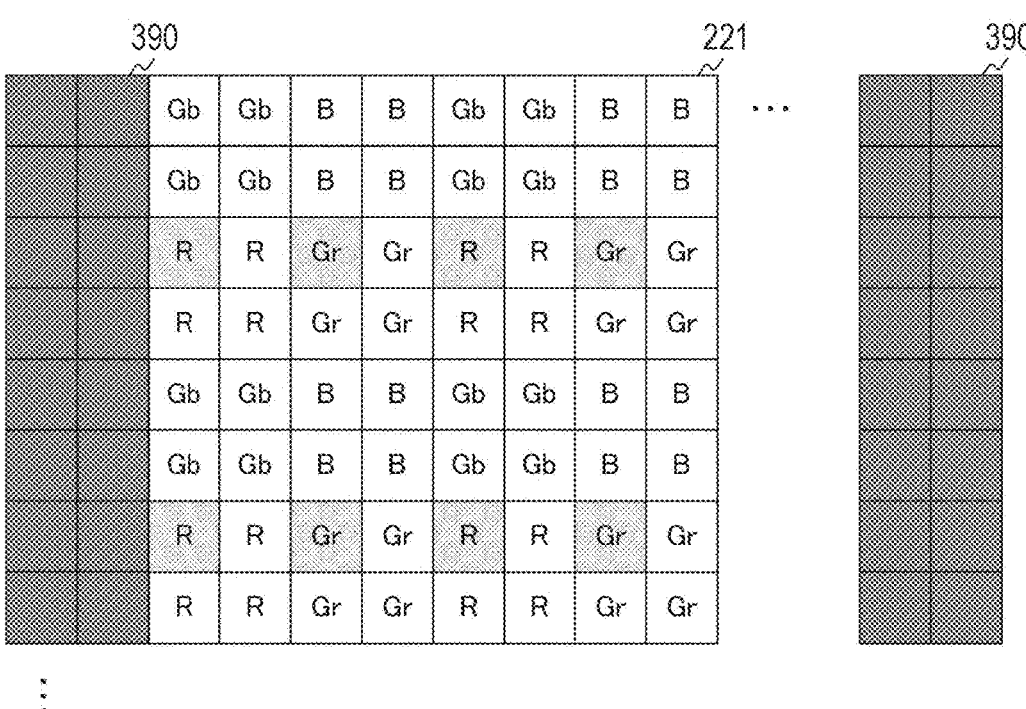
FIGS. 20A, 20B, and 20C are diagrams illustrating an effect of correction according to the second embodiment of the present technology.
Figure 20B:
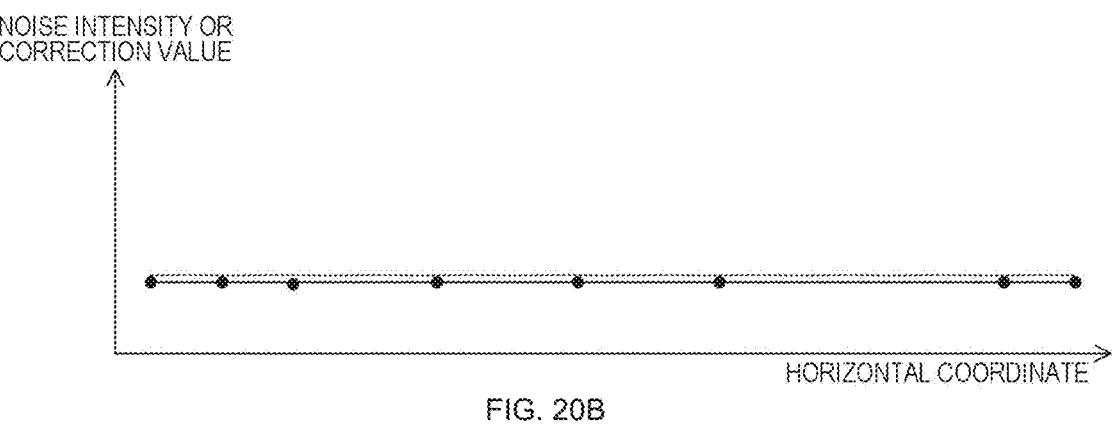
Figure 20C:
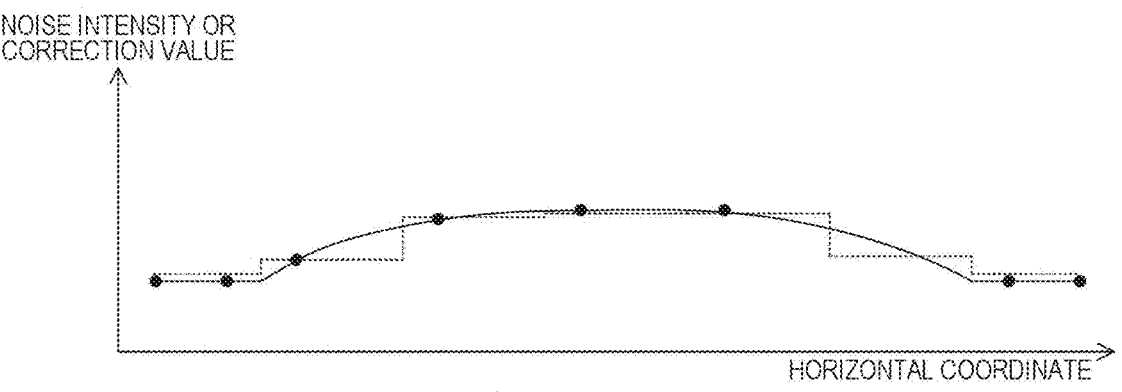

FIGS. 20A, 20B, and 20C are diagrams illustrating an effect of correction in the second embodiment of the present technology. FIG. 20A in the drawing illustrates an example of the pixel array unit 220 in the second embodiment. FIG. 20B in the drawing is a graph illustrating an example of the noise intensity and the correction value for each column in a case where no local noise occurs. FIG. 20C in the drawing is a graph illustrating an example of the noise intensity and the correction value for each column in a case where local noise occurs.

As illustrated in FIG. 20A of the drawing, in the second embodiment, the shaded pixels 390 are arranged on the left and right of the effective pixel region, and the EOPB pixels are arranged in the effective pixel region.

A vertical axis of FIGS. 20B and 20C in the drawing represents the noise intensity or the correction value, and a horizontal axis represents the horizontal coordinate. In addition, a solid line indicates the noise intensity for each column, and a dotted line indicates the correction value. A black circle indicates the OPB signal or the EOPB signal.

As illustrated in FIG. 20B of the drawing, in a case where local noise does not occur and the noise intensity of each column is constant in the row, the tendencies of the noise and the correction value are similar. Therefore, noise is sufficiently removed by the dark correction.

As illustrated in FIG. 20C of the drawing, even in a case where local noise occurs and the noise intensity of each column varies non-linearly in a row, the tendencies of the noise and the correction value are close due to the signal of the EOPB pixel. Therefore, unlike the comparative example, noise is sufficiently removed by dark correction. As a result, the image quality of the image data can be improved as compared with the comparative example.

As described above, according to the second embodiment of the present technology, since the EOPB pixels are arranged in parallel in the quad Bayer array, image quality can be improved in the solid-state imaging element 200 in the quad Bayer array.

FIRST MODIFICATION EXAMPLE

In the second embodiment described above, two frames are generated within the 1V period, but in this configuration, the frame rate is reduced to half as compared with the first embodiment. A solid-state imaging element 200 according to a first modification of the second embodiment is different from that of the second embodiment in that the number of times of AD conversion is reduced to suppress a decrease in a frame rate.

Figures 21A, 21B, 21C, 21D:
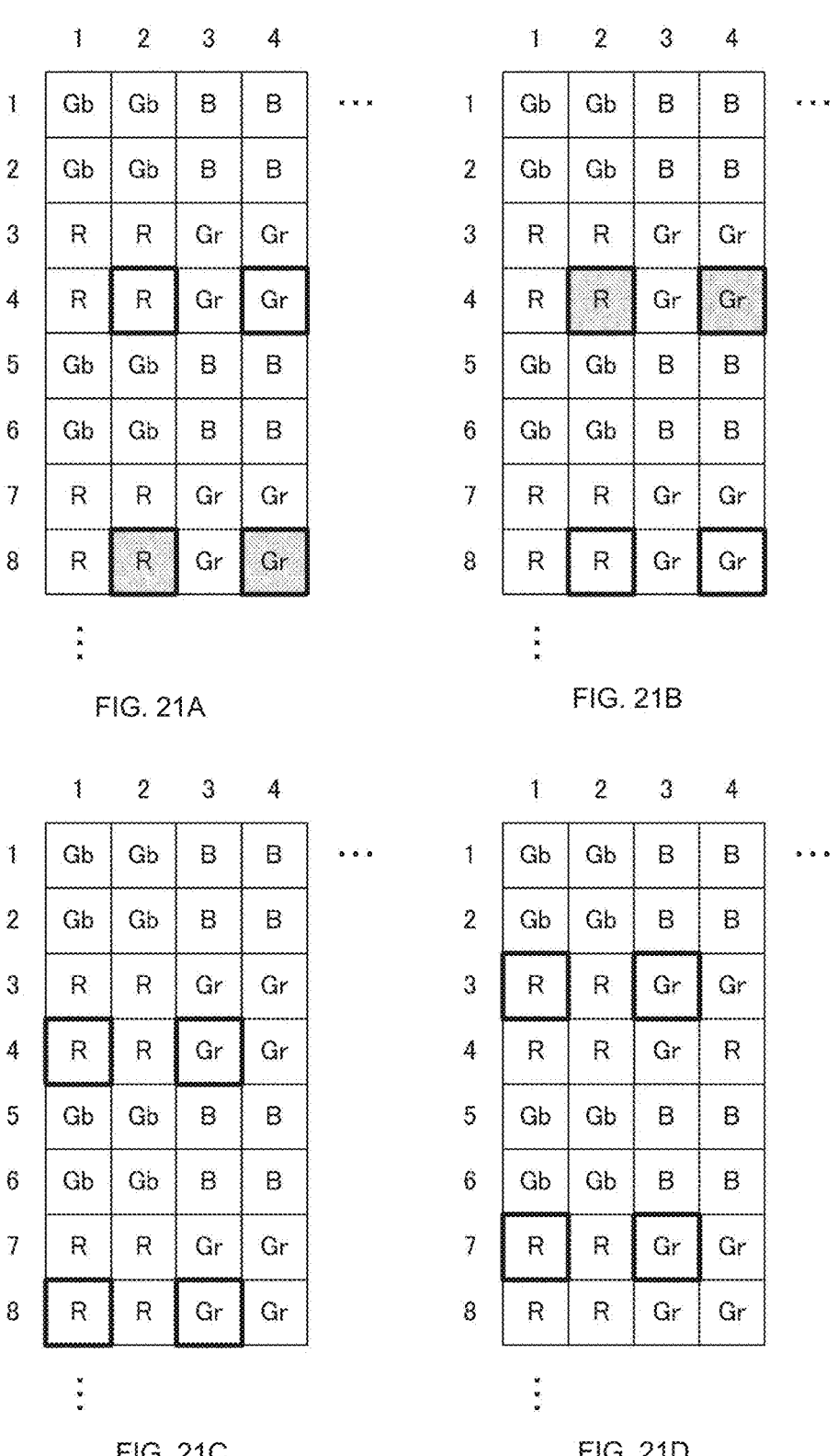
FIGS. 21A, 21B, 21C, and 21D are diagrams illustrating a driving method up to fourth analog to digital (AD) conversion in a first modification of the second embodiment of the present technology.

FIGS. 21A, 21B, 21C, and 21D are diagrams illustrating a driving method up to fourth AD conversion in the first modification of the second embodiment of the present technology. FIG. 21A in the drawing indicates a first AD conversion target pixel, and FIG. 21B in the drawing indicates a second AD conversion target pixel. FIG. 21C in the drawing represents a third AD conversion target pixel, and FIG. 21D in the drawing represents a fourth AD conversion target pixel.

In the comparative example without the EOPB pixels, in a case where the reading unit 230 reads 2 rows (in other words, four rows in units of pixels) in units of pixel blocks within the 1 V period, the number of pixels for each column is eight, and thus, the reading unit 230 performs AD conversion eight times.

On the other hand, in the first modification of the second embodiment, the reading unit 230 further performs AD conversion on the EOPB signals for two pixels within the 1 V period, and performs AD conversion ten times in total.

For example, as illustrated in FIG. 21A of the drawing, focusing on 8 rows x 4 columns, the drive unit 210 causes the pixels of the second column and the fourth column in the fourth row to output the effective pixel signals, and causes the pixels of the second column and the fourth column in the eighth row to output the EOPB signals. The reading unit 230 performs AD conversion on these pixel signals. In the drawing, thick frame pixels indicate pixels that output pixel signals. Furthermore, a gray pixel indicates a pixel that outputs the EOPB signal.

Next, as illustrated in FIG. 21B of the drawing, the drive unit 210 causes the pixels in the second column and the fourth column in the fourth row to output the EOPB signal, and causes the pixels in the second column and the fourth column in the eighth row to output the effective pixel signal.

Next, as illustrated in FIG. 21C of the drawing, the drive unit 210 cause the pixels in the first column and the third column in the fourth row and the pixels in the first column and the third column in the eighth row to output effective pixel signals. Next, as illustrated in FIG. 21D in the drawing, the drive unit 210 causes effective pixel signals to the pixels in the first column and the third column in the third row and the pixels in the first column and the third column in the seventh row to output the effective pixel signals.

Figures 22A, 22B, 22C, 22D:
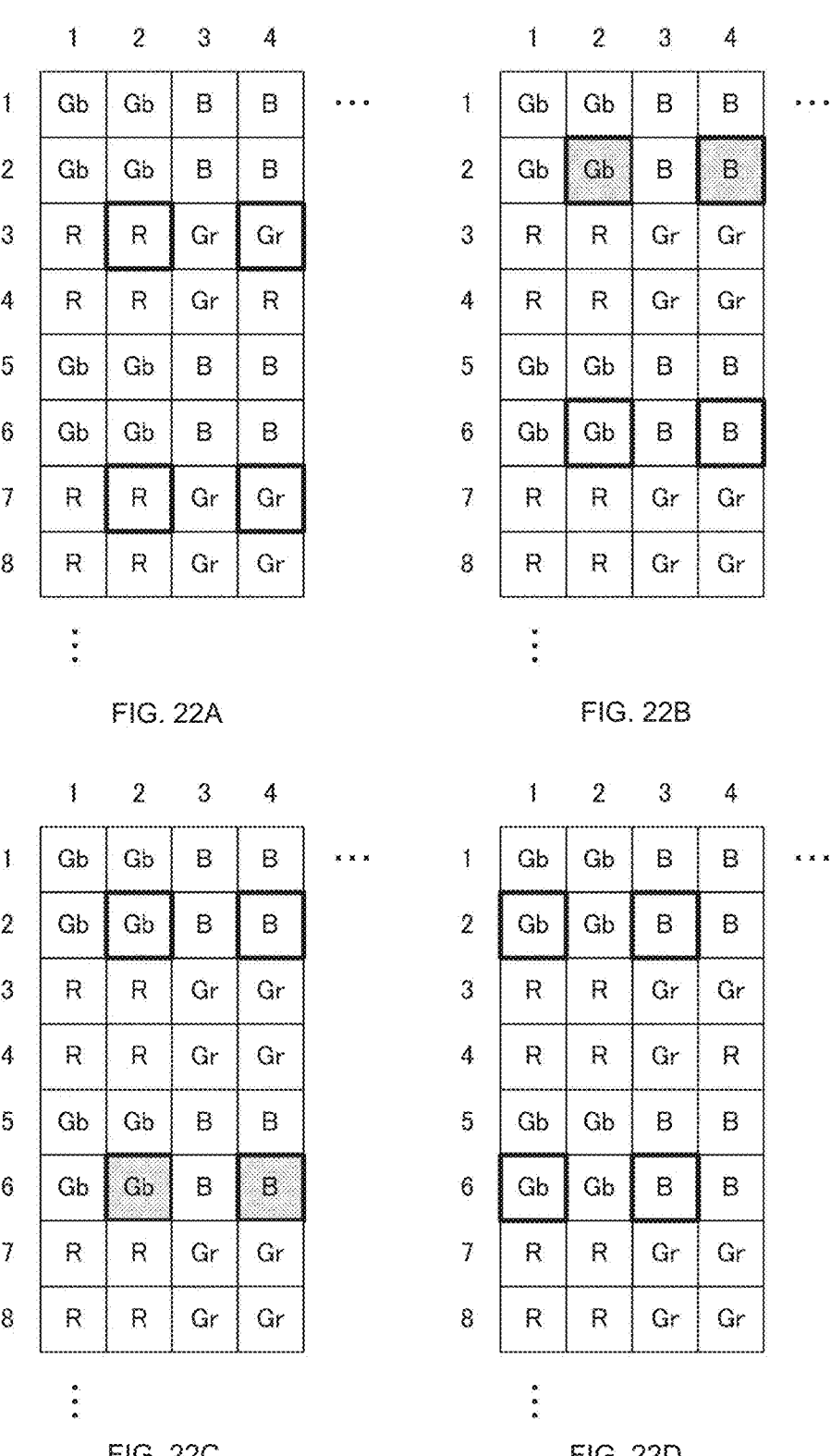
FIGS. 22A, 22B, 22C, and 22D are diagrams illustrating a driving method up to eighth AD conversion in the first modification of the second embodiment of the present technology.

FIGS. 22A, 22B, 22C, and 22D are diagrams illustrating a driving method up to eighth AD conversion in the first modification of the second embodiment of the present technology. FIG. 22A in the drawing indicates a fifth AD conversion target pixel, and FIG. 22B in the drawing indicates a sixth AD conversion target pixel. FIG. 22C in the drawing represents a seventh AD conversion target pixel, and FIG. 22D in the drawing represents an eighth AD conversion target pixel.

As illustrated in FIG. 22A of the drawing, after the fourth AD conversion, the drive unit 210 causes the pixels in the second column and the fourth column in the third row and the pixels in the second column and the fourth column in the seventh row to output the effective pixel signals.

Next, as illustrated in FIG. 22B of the drawing, the drive unit 210 causes the pixels in the second column and the fourth column in the second row to output the EOPB signal, and causes the pixels in the second column and the fourth column in the sixth row to output the effective pixel signals.

Next, as illustrated in FIG. 22C of the drawing, the drive unit 210 causes the pixels in the second column and the fourth column in the second row to output the effective pixel signals, and causes the pixels in the second column and the fourth column in the sixth row to output the EOPB signals. Next, as illustrated in FIG. 22D in the drawing, the drive unit 210 causes the pixels in the first column and the third column in the second row and the pixels in the first column and the third column in the sixth row to output the effective pixel signals.

FIGS. 23A and 23B are diagrams illustrating a driving method up to the tenth AD conversion in the first modification of the second embodiment of the present technology. FIG. 23A in the drawing indicates a ninth AD conversion target pixel, and FIG. 23B in the drawing indicates a tenth AD conversion target pixel.

As exemplified in FIG. 23A of the drawing, after the eighth AD conversion, the drive unit 210 causes the pixels of the first column and the third column in the first row and the pixels of the first column and the third column in the fifth row to output the effective pixel signals. Next, as exemplified in FIG. 23B of the drawing, the drive unit 210 causes the pixels in the second column and the fourth column in the first row and the pixels in the second column and the fourth column in the fifth row to output the effective pixel signals.

Under the control illustrated in FIGS. 21A, 21B. 21C, 21D. 22A, 22B, 22C 22D, 23A, and 23B, AD conversion is performed on two rows in units of pixel blocks. The remaining rows are subjected to AD conversion under the similar control, and a frame is generated. As described above, the drive unit 210 in the first modification of the second embodiment generates a frame by control for driving all the effective pixels and the EOPB pixels. Since there is no need to generate two frames within the 1V period, the frame rate can be improved as compared with the second embodiment.

Figure 24:
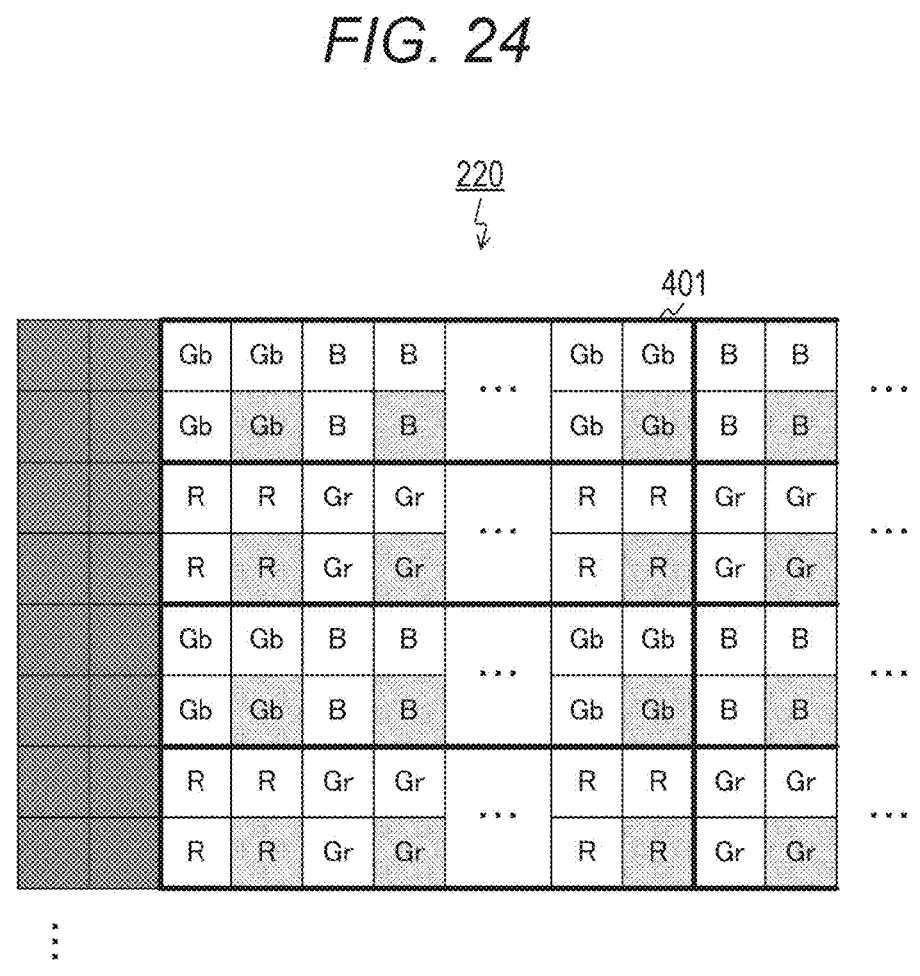

FIG. 24 is a diagram illustrating an example of the correction region 401 in the first modification of the second embodiment of the present technology. As illustrated in the drawing, the effective pixel region is divided by a plurality of rectangular correction regions 401. A predetermined number of EOPB pixels are arranged in each correction region 401. In the drawing, a gray pixel indicates an EOPB pixel.

Figure 25A:
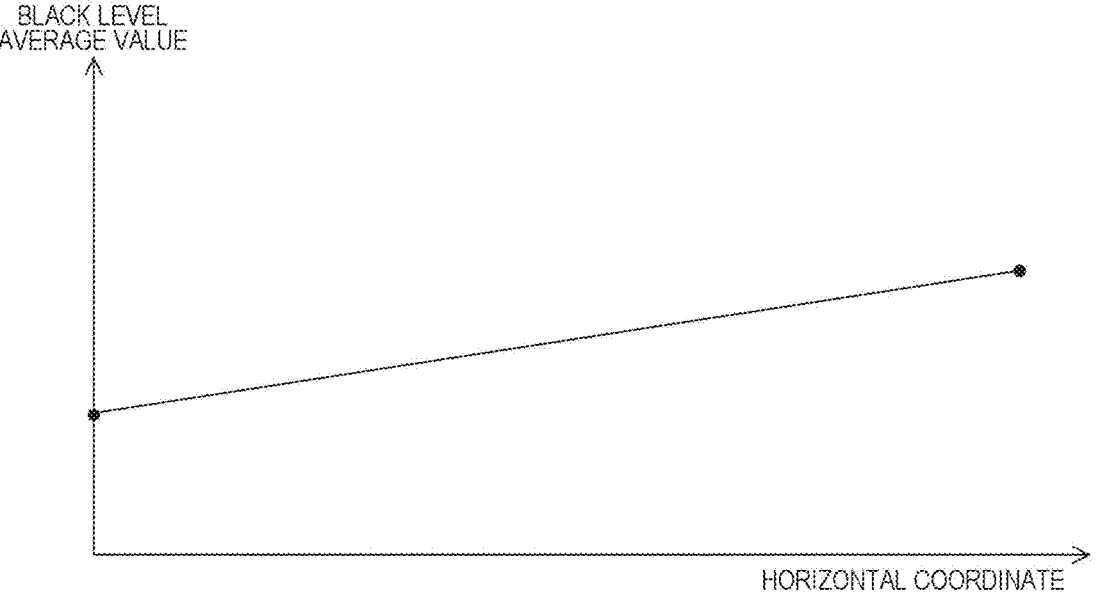
FIGS. 25A and 25B are graphs illustrating an example of a black level average value for each horizontal coordinate in a comparative example and the first modification of the second embodiment of the present technology.
Figure 25B:
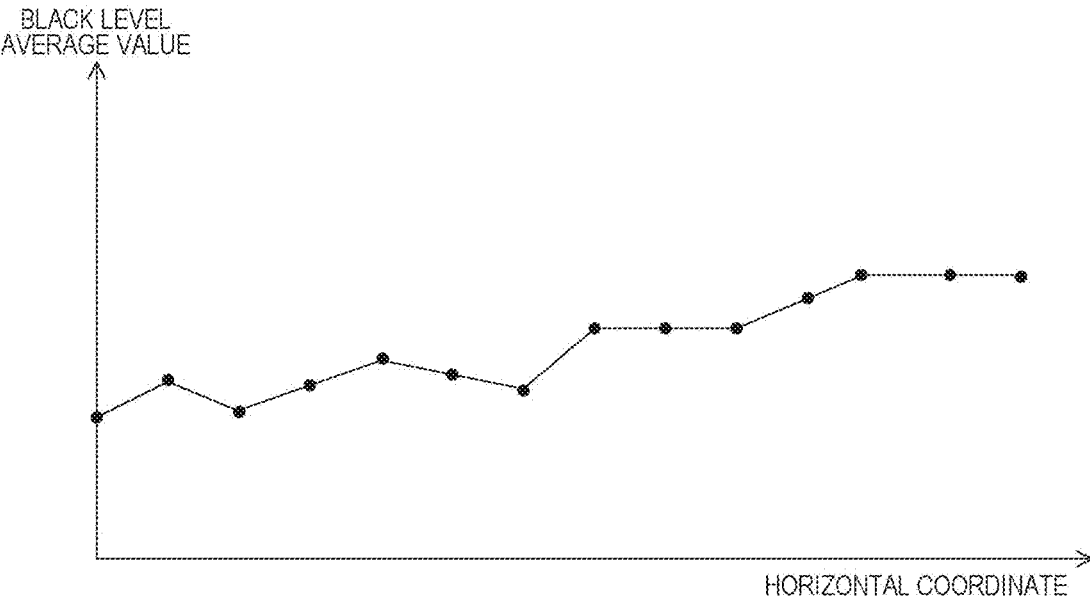

FIGS. 25A and 25B are graphs illustrating an example of black level average values for each horizontal coordinate in the comparative example and the first modification of the second embodiment of the present technology. FIG. 25A in the drawing is a graph illustrating an example of the black level average value for each horizontal coordinate in a comparative example in which the shaded pixel 390 is arranged on the left side and the right side and the EOPB pixel is not arranged. FIG. 25B in the drawing is a graph illustrating an example of a black level average value for each horizontal coordinate in the first modification of the second embodiment. In the drawing, a vertical axis represents an average value of black levels, and a horizontal axis represents a horizontal coordinate. In addition, black circles indicate average values obtained from the pixel signals.

As illustrated in FIG. 25A of the drawing, in the comparative example, the black level average value at the left end and the black level average value at the right end are obtained from the left and right shaded pixels 390. Since only two points of the left end and the right end can be obtained as the average value, the correction value of the coordinate between these points is linearly interpolated from the values of the left end and the right end, for example. In this comparative example, noise that varies linearly between the left end and the right end can be removed, but noise that varies non-linearly cannot be removed.

On the other hand, as illustrated in FIG. 25B of the drawing, in the first modification of the second embodiment, a plurality of average values is obtained between the left end and the right end. With performing dark correction using these average values, even in a case where non-linear noise occurs, the non-linear noise can be removed by the correction value with the same tendency as that of the noise.

As described above, according to the first modification of the second embodiment of the present technology, since the number of times of AD conversion within the 1V period is reduced as compared with the second embodiment, the frame rate can be improved.

SECOND MODIFICATION EXAMPLE

In the second embodiment described above, the signal processing unit 260 corrects the effective pixel signal using the OPB signal and the EOPB signal, but in this configuration, there is a need to arrange a shaded pixel 390 in addition to an effective pixel 221 in a pixel array unit 220. A solid-state imaging element 200 in a second modification of the second embodiment is different from that of the first embodiment in that the number of shaded pixels 390 is reduced and an effective pixel signal is corrected using only an EOPB signal.

Figure 26:
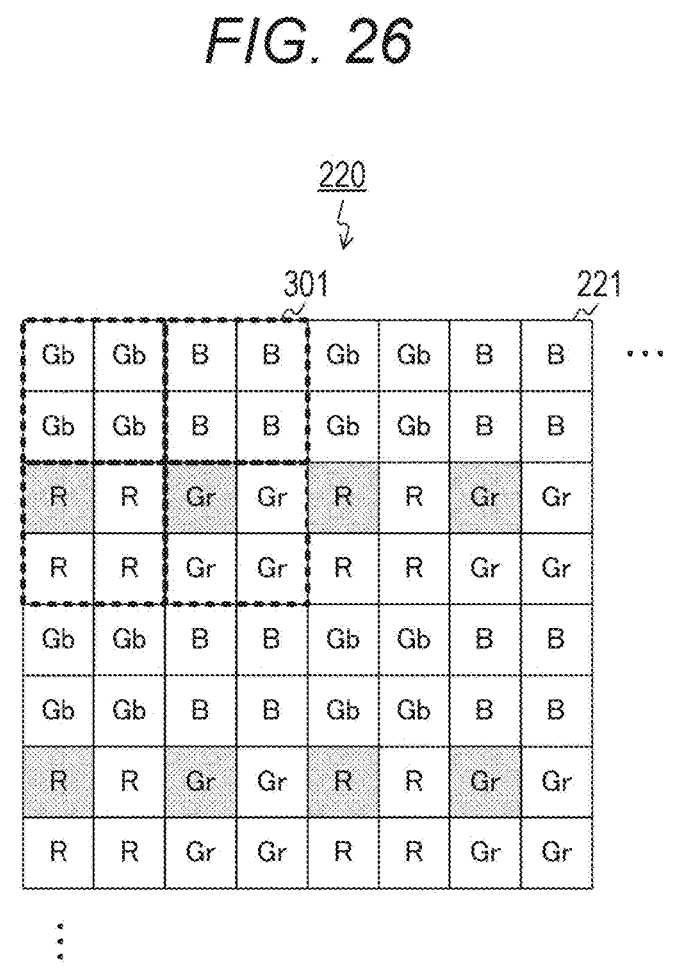

FIG. 26 is an example of the plan view of a pixel array unit 220 in the second modification of the second embodiment of the present technology. The pixel array unit 220 of the second modification of the second embodiment is different from that of the first embodiment in that the shaded pixel 390 is not arranged.

Figure 27:
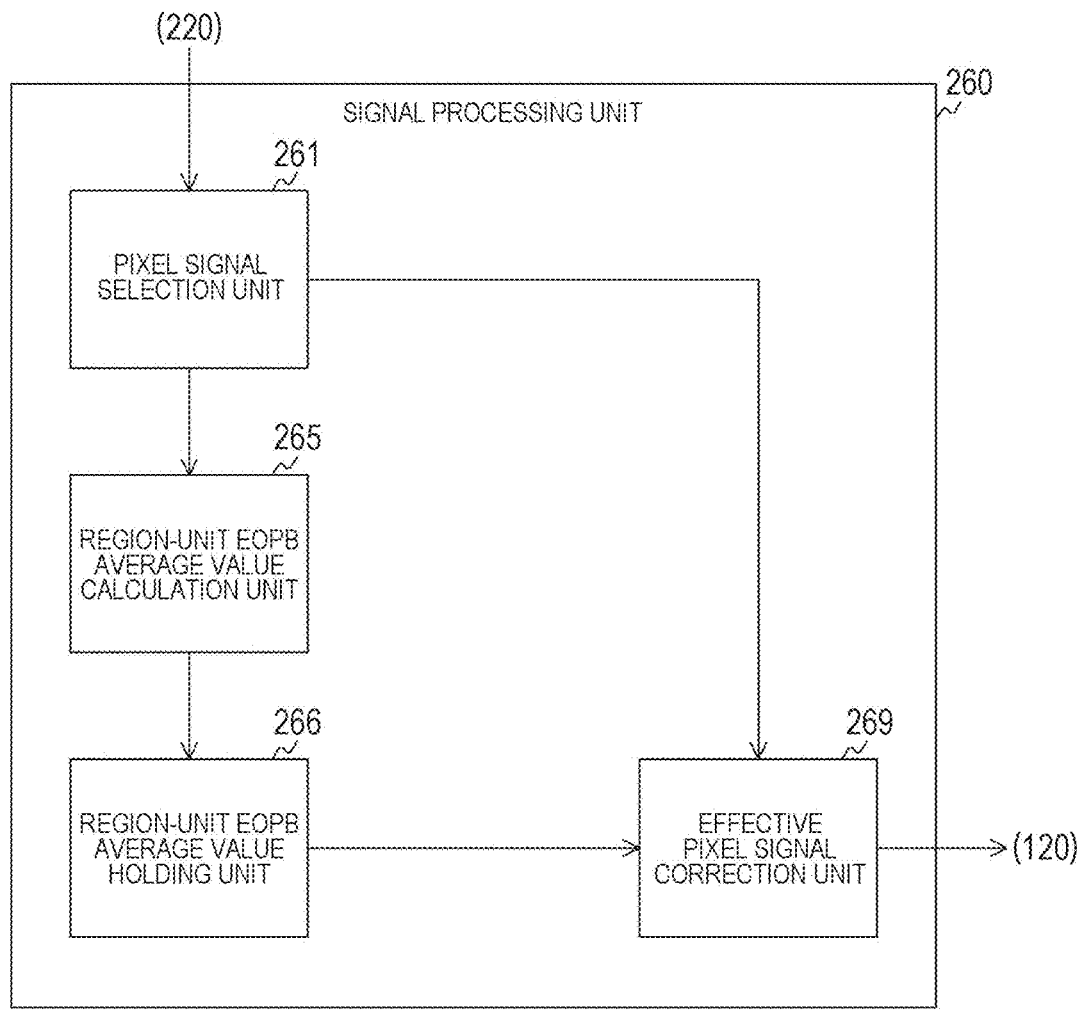
FIG. 27 is a block diagram illustrating a configuration example of a signal processing unit in the second modification of the second embodiment of the present technology.

FIG. 27 is a block diagram illustrating a configuration example of the signal processing unit 260 in the second modification of the second embodiment of the present technology. The signal processing unit 260 of the second modification of the second embodiment is different from the configuration of the first embodiment illustrated in FIG. 9 in that the left and right OPB average value calculation unit 263, the EOPB signal correction unit 264, the normalization unit 267, and the region-unit correction value calculation unit 268 are not provided.

The signal processing unit 260 of the second modification of the second embodiment corrects the effective pixel signal of the current frame using the EOPB signal of a previous frame.

Note that, in a case where the average value for M rows of the current frame is used, an effective pixel signal holding unit 262 is only required to be added to the signal processing unit 260 illustrated in FIG. 27, similarly to the configuration illustrated in FIG. 10.

Figure 28A:
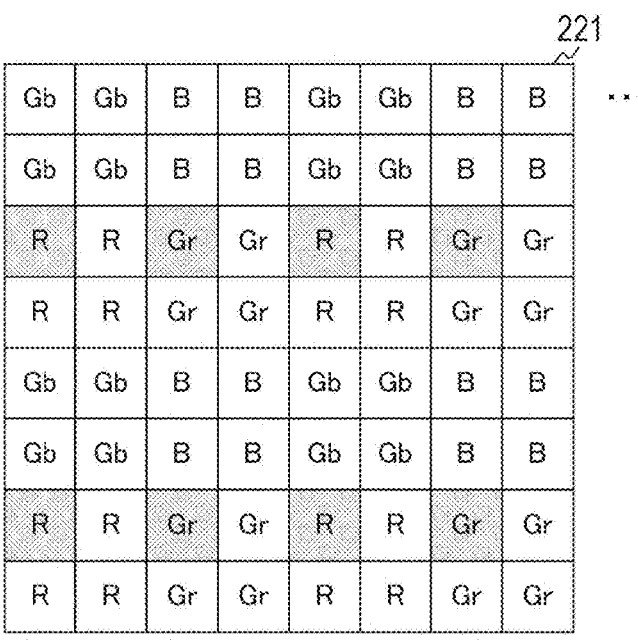
FIGS. 28A, 28B, and 28C are diagrams illustrating an effect of correction in the second modification of the second embodiment of the present technology.
Figure 28B:
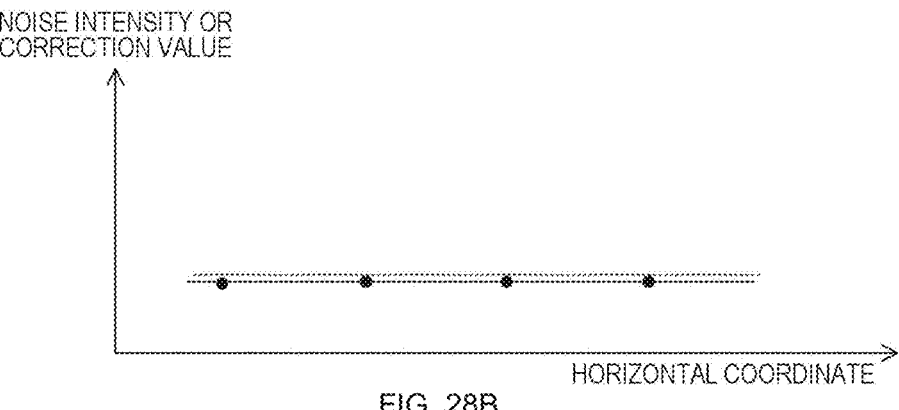
Figure 28C:
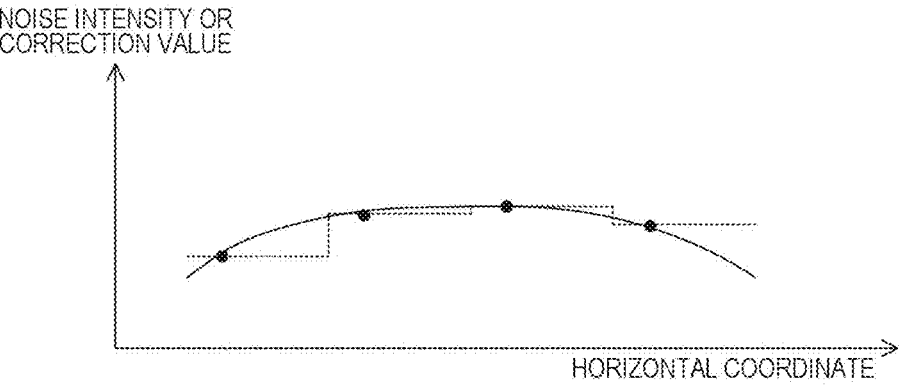

FIGS. 28A, 28B, and 28C are diagrams illustrating an effect of correction in the second modification of the second embodiment of the present technology. FIG. 28A in the drawing illustrates an example of the pixel array unit 220 of the second modification of the second embodiment. FIG. 28B in the drawing is a graph illustrating an example of the noise intensity and the correction value for each column in a case where no local noise occurs. FIG. 28C in the drawing is a graph illustrating an example of the noise intensity and the correction value for each column in a case where local noise occurs.

As illustrated in FIG. 28A of the drawing, in the second modification of the second embodiment, the shaded pixels 390 on the left and right of the effective pixel region are reduced. This makes it possible to increase the number of pixels or the light receiving area per pixel, and makes it easy to increase the number of pixels or the sensitivity A vertical axis of FIGS. 28B and 28C in the drawing represents the noise intensity or the correction value, and a horizontal axis represents the horizontal coordinate. In addition, a solid line indicates the noise intensity for each column, and a dotted line indicates the correction value. A black circle indicates the EOPB signal.

As illustrated in FIG. 28B of the drawing, in a case where no local noise is generated, the tendencies of the noise and the correction value are substantially the same. Therefore, noise is sufficiently removed by the dark correction.

As illustrated in FIG. 28C of the drawing, even in a case where local noise occurs and the noise intensity of each column varies non-linearly in a row, the tendencies of the noise and the correction value are close due to the signal of the EOPB pixel. Therefore, noise is sufficiently removed by a specific dark correction.

As described above, according to the second modification of the second embodiment of the present technology, since the number of shaded pixels 390 is reduced, it is easy to increase the number of pixels or to increase the sensitivity.

3. APPLICATION EXAMPLE TO MOBILE OBJECT

The technology according to the present disclosure (present technology) can be applied to various products. For example, the technology according to the present disclosure may be implemented as a device mounted on any type of mobile body such as an automobile, an electric vehicle, a hybrid electric vehicle, a motorcycle, a bicycle, a personal mobility, an airplane, a drone, a ship, a robot, and the like.

Figure 29:
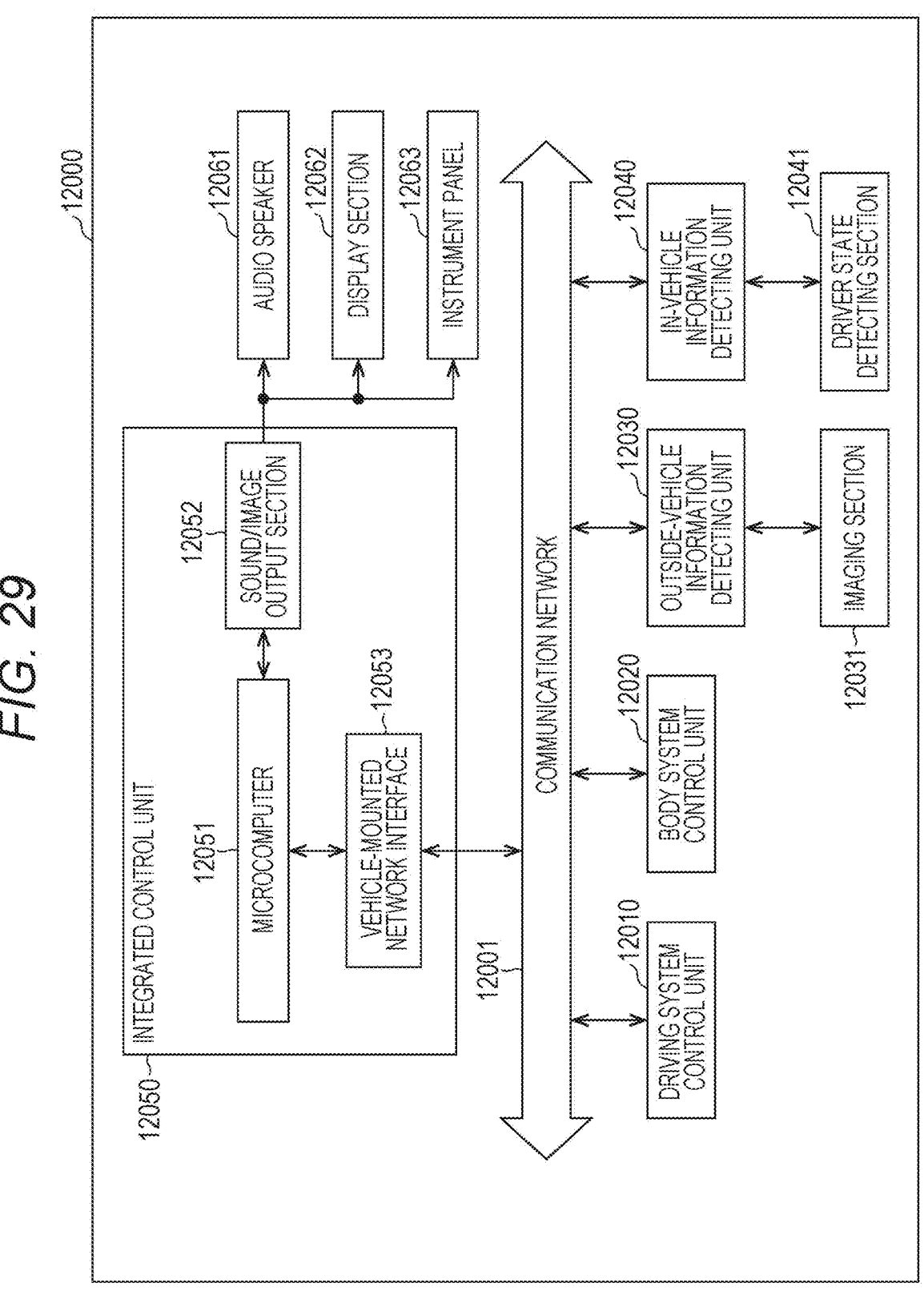
FIG. 29 is a block diagram illustrating a schematic configuration example of a vehicle control system.

FIG. 29 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example illustrated in FIG. 29, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 29, an audio speaker 12061, a display section 12062, and an instrument panel 12063 are illustrated as the output device. The display section 12062 may, for example, include at least one of an on-board display and a head-up display.

Figure 30:
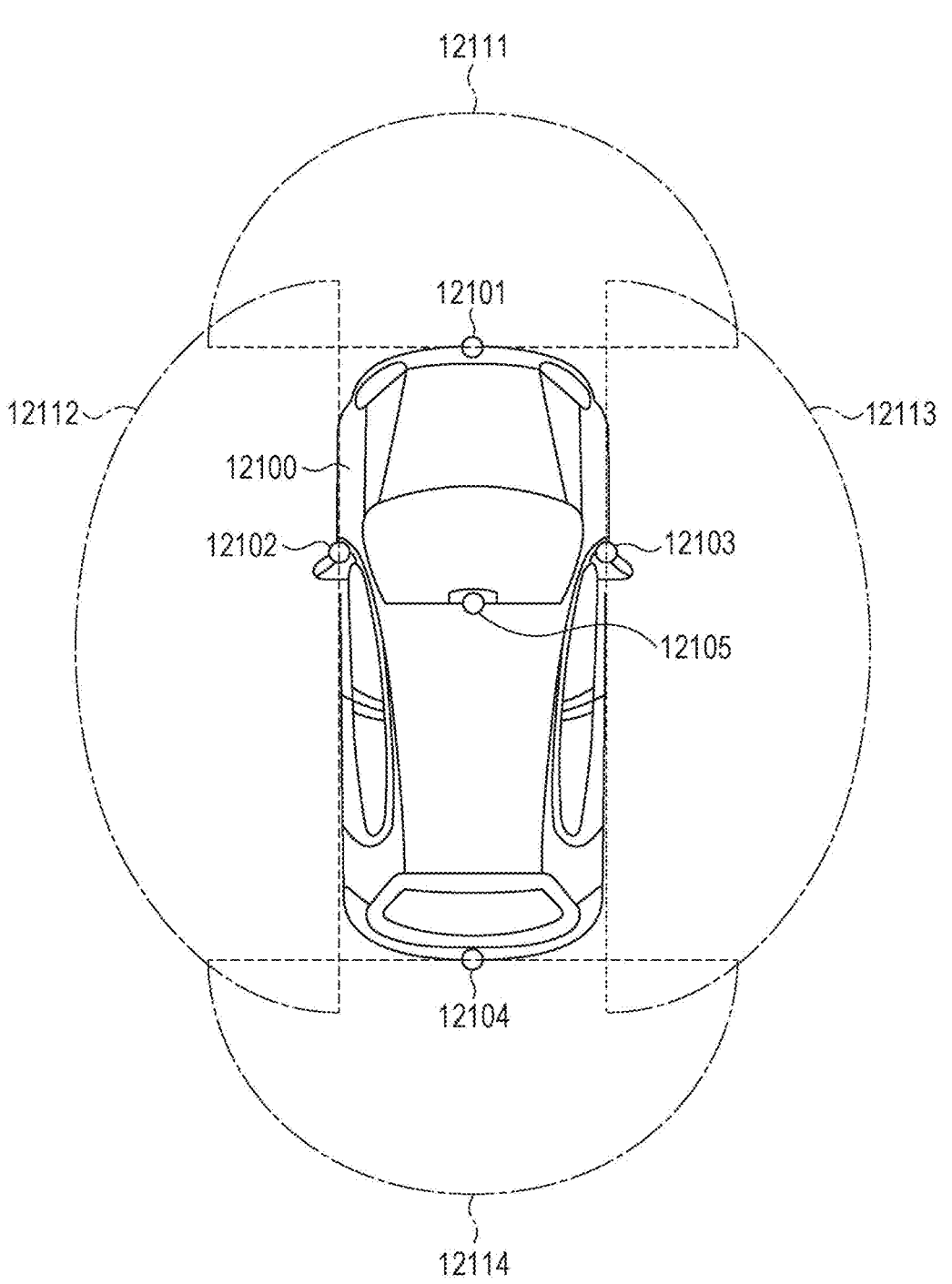
FIG. 30 is an illustrative diagram illustrating an example of an installation position of an imaging section.

FIG. 30 is a diagram depicting an example of the installation position of the imaging section 12031.

In FIG. 30, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle, and the like. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 30 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure may be applied to the imaging section 12031 out of the configurations described above. Specifically, the imaging device 100 in FIG. 1 can be applied to the imaging section 12031. With application of the technology of the present disclosure to the imaging section 12031, a more easily viewable captured image can be obtained, thereby being capable of reducing fatigue of the driver.

Note that the embodiments described above show examples for embodying the present technology, and the matters in the embodiments and the matters specifying the invention in the claims have corresponding relationships, respectively. Similarly, the matters specifying the invention in the claims and matters with the same names in the embodiments of the present technology have correspondence relationships, respectively. However, the present technology is not limited to the embodiments, and can be embodied by applying various modifications to the embodiments without departing from the gist of the present technology.

Note that effects described in the present specification are merely examples and are not limited, and other effects may be provided.

Note that the present technology may also have the following configuration.

(1) A solid-state imaging element including:

a pixel array unit in which a plurality of effective pixels that is not shaded from light is arranged;

a drive unit that performs control of driving each of the plurality of effective pixels to generate an analog signal according to an exposure amount as an effective pixel signal and control of driving a specific pixel among the plurality of effective pixels to generate an analog signal according to a dark current as an additional shaded pixel signal; and a signal processing unit that corrects the effective pixel signal using the additional shaded pixel signal.

(2) The solid-state imaging element according to (1) described above, in which the pixel array unit includes:

a decapixel block in which ten effective pixels sharing a floating diffusion layer are arranged; and an octapixel block in which eight effective pixels sharing the floating diffusion layer are arranged.

(3) The solid-state imaging element according to (2) described above, further including:

a first analog-to-digital converter that converts the effective pixel signal from the effective pixel in the decapixel block into a digital signal; and a second analog-to-digital converter that converts the effective pixel signal from the effective pixel in the octapixel block into a digital signal.

(4) The solid-state imaging element according to (3) described above, in which the drive unit drives the effective pixel in the decapixel block as the specific pixel, and the second analog-to-digital converter converts each of the effective pixel signal and the additional shaded pixel signal into a digital signal.

(5) The solid-state imaging element according to (1) described above, in which the pixel array unit includes a predetermined number of pixel blocks in which a plurality of effective pixels sharing a floating diffusion layer is arranged, and the drive unit drives some effective pixels in the pixel block as the specific pixels.

(6) The solid-state imaging element according to (5) described above, in which the drive unit generates image data by control for driving the specific pixel and remaining effective pixels in the pixel array unit.

(7) The solid-state imaging element according to (5) described above, in which the drive unit generates image data by control for driving all the effective pixels and the specific pixels in the pixel array unit.

(8) The solid-state imaging element according to any one of (1) to (8) described above, in which the pixel array unit is divided into a predetermined number of correction regions, and the signal processing unit includes an effective pixel signal correction unit that corrects the effective pixel signal of the effective pixel in the correction region by using the additional shaded pixel signal of the specific pixel in the correction region.

(9) The solid-state imaging element according to (8) described above, in which the signal processing unit further includes an effective pixel signal correction unit that holds the effective pixel signal.

(10) The solid-state imaging element according to (8) or (9) described above, in which the pixel array unit further includes a shaded pixel, the signal processing unit further includes an additional shaded pixel signal correction unit that corrects the additional shaded pixel signal by using a shaded pixel signal from the shaded pixel, and the effective pixel signal correction unit corrects the effective pixel signal using the corrected additional shaded pixel signal and the shaded pixel signal.

(11) An imaging device including:

a pixel array unit in which a plurality of effective pixels that is not shaded from light is arranged;

a drive unit that performs control of driving each of the plurality of effective pixels to generate an analog signal according to an exposure amount as an effective pixel signal and control of driving a specific pixel among the plurality of effective pixels to generate an analog signal according to a dark current as an additional shaded pixel signal;

a signal processing unit that corrects the effective pixel signal using the additional shaded pixel signal; and a recording unit that records image data in which the corrected effective pixel signals are arranged.

(12) A method for controlling a solid-state imaging element, the method including:

a driving procedure of performing control of driving each of a plurality of effective pixels in a pixel array unit in which the plurality of effective pixels that is not shaded from light is arranged to generate an analog signal according to an exposure amount as an additional shaded pixel signal and control of driving a specific pixel among the plurality of effective pixels to generate an analog signal according to a dark current as an additional shaded pixel signal; and a signal processing procedure of correcting the effective pixel signal using the additional shaded pixel signal.

REFERENCE SIGNS LIST

100 Imaging device
110 Control unit
120 Recording unit
200 Solid-state imaging element 210 Drive unit
220 Pixel array unit
221, 221-1, 221-2 Effective pixel
222 Microlens
230 Reading unit
231, 232 Multiplexer
233 to 235 ADC
236, 237 Capacitor
238 Comparator
239 Counter
240 Reference signal generation unit
250 Timing control unit
260 Signal processing unit
261 Pixel signal selection unit
262 Effective pixel signal holding unit
263 Left and right OPB average value calculation unit
264 EOPB signal correction unit
265 Region-unit EOPB average value calculation unit
266 Region-unit EOPB average value holding unit
267 Normalization unit
268 Region-unit correction value calculation unit
269 Effective pixel signal correction unit
300, 300-1, 300-2 Decapixel block
301 Pixel block
311 to 320, 361 to 368, 391 Photoelectric conversion element
321 to 330, 371 to 378, 392 Transfer transistor
341, 381, 393 Reset transistor
342, 382, 394 Floating diffusion layer
343, 383, 395 Amplification transistor
344, 384, 396 Selection transistor
350, 350-1, 350-2 Octapixel block
390 Shaded pixel
12031 Imaging section

The invention claimed is:

1. A solid-state imaging element, comprising:
a pixel array unit comprising:
    a plurality of effective pixels that is not shaded from light;
    a decapixel block comprising ten effective pixels of the plurality of effective pixels, wherein the ten effective pixels of the plurality of effective pixels share a first floating diffusion layer; and
    an octapixel block comprising eight effective pixels of the plurality of effective pixels, wherein the eight effective pixels of the plurality of effective pixels share a second floating diffusion layer;
a drive unit configured to:
    drive each of the plurality of effective pixels to generate a first analog signal as an effective pixel signal, wherein the first analog signal is generated based on an exposure amount; and
    drive a specific pixel among the plurality of effective pixels to generate a second analog signal as an additional shaded pixel signal, wherein the second analog signal is generated based on a dark current; and
a signal processing unit configured to correct the effective pixel signal based on using the additional shaded pixel signal.

2. The solid-state imaging element according to claim 1, further comprising:
a first analog-to-digital converter configured to convert the effective pixel signal from an effective pixel in the decapixel block into a first digital signal; and a second analog-to-digital converter configured to convert the effective pixel signal from an effective pixel in the octapixel block into a second digital signal.

3. The solid-state imaging element according to claim 2, wherein the drive unit is further configured to drive drives the effective pixel in the decapixel block as the specific pixel, and the second analog-to-digital converter is further configured to convert each of the effective pixel signal and the additional shaded pixel signal into a third digital signal.

4. The solid-state imaging element according to claim 1, wherein the drive unit is further configured to drive first effective pixels in the decapixel block as specific pixels.

5. The solid-state imaging element according to claim 4, wherein the drive unit is further configured to generate image data, based on the drive of the specific pixels of the plurality of effective pixels and the drive of remaining effective pixels of the plurality of effective pixels.

6. The solid-state imaging element according to claim 4, wherein the drive unit is further configured to generate image data, based on the drive of all the effective pixels of the plurality of effective pixels and the drive of the specific pixels.

7. The solid-state imaging element according to claim 1, wherein the pixel array unit is divided into a specific number of correction regions, the signal processing unit includes an effective pixel signal correction unit, and the effective pixel signal correction unit is configured to correct the effective pixel signal of an effective pixel in a correction region of the specific number of correction regions, based on the additional shaded pixel signal of the specific pixel in the correction region.

8. The solid-state imaging element according to claim 7, wherein the signal processing unit further includes an effective pixel signal holding unit configured to hold the effective pixel signal.

9. The solid-state imaging element according to claim 7, wherein the pixel array unit further includes a shaded pixel, and the signal processing unit further includes:

an additional shaded pixel signal correction unit configured to correct the additional shaded pixel signal based on a shaded pixel signal from the shaded pixel; and the effective pixel signal correction unit is further configured to correct the effective pixel signal based on the corrected additional shaded pixel signal and the shaded pixel signal.

10. An imaging device, comprising:

a pixel array unit comprising:

a plurality of effective pixels that is not shaded from light;

a decapixel block comprising ten effective pixels of the plurality of effective pixels, wherein the ten effective pixels of the plurality of effective pixels share a first floating diffusion layer; and an octapixel block comprising eight effective pixels of the plurality of effective pixels, wherein the eight effective pixels of the plurality of effective pixels share a second floating diffusion layer; and a drive unit configured to:

drive each of the plurality of effective pixels to generate a first analog signal as an effective pixel signal, wherein the first analog signal is generated based on an exposure amount; and drive a specific pixel among the plurality of effective pixels to generate a second analog signal as an additional shaded pixel signal, wherein the second analog signal is generated based on a dark current;

a signal processing unit configured to correct the effective pixel signal based on the additional shaded pixel signal; and a recording unit configured to record image data comprising the corrected effective pixel signals.

11. A method for controlling a solid-state imaging element, the method comprising:

driving each of a plurality of effective pixels in a pixel array unit to generate a first analog signal as an effective pixel signal, wherein the plurality of effective pixels is not shaded from light, the first analog signal is generated based on an exposure amount, and the pixel array unit includes:

a decapixel block comprising ten effective pixels of the plurality of effective pixels, wherein the ten effective pixels of the plurality of effective pixels share a first floating diffusion layer, and an octapixel block comprising eight effective pixels of the plurality of effective pixels, wherein the eight effective pixels of the plurality of effective pixels share a second floating diffusion layer;

driving a specific pixel among the plurality of effective pixels to generate a second analog signal as an additional shaded pixel signal, wherein the second analog signal is generated based on a dark current; and correcting the effective pixel signal based on the additional shaded pixel signal.

* * * * *